(12) United States Patent
Olesinski et al.

(10) Patent No.: US 7,596,789 B2
(45) Date of Patent: Sep. 29, 2009

(54) METHOD AND APPARATUS FOR SCHEDULING AND SERVICING EVENTS USING A CALENDAR STRUCTURE

(75) Inventors: Wladyslaw Olesinski, Kanata (CA); Mustapha Aissaoui, Kanata (CA); Robert E. Robotham, Ottawa (CA); Jordan (Jianping) Lu, Kanata (CA)

(73) Assignee: Alcatel-Lucent Canada Inc., Kanata, Ontario (CA)

( * ) Notice: Subject to any disclaimer, the term of this patent is extended or adjusted under 35 U.S.C. 154(b) by 1082 days.

(21) Appl. No.: 10/334,204

(22) Filed: Dec. 30, 2002

(65) Prior Publication Data
US 2003/0182352 A1 Sep. 25, 2003

Related U.S. Application Data

(60) Provisional application No. 60/344,935, filed on Dec. 31, 2001, provisional application No. 60/383,911, filed on May 29, 2002.

(51) Int. Cl.
*G06F 9/00* (2006.01)
(52) U.S. Cl. .................................. 718/102; 370/395.4
(58) Field of Classification Search ................ 718/100, 718/102, 103; 719/318; 705/9; 370/229, 370/230, 395.4
See application file for complete search history.

(56) References Cited

U.S. PATENT DOCUMENTS

RE32,655 E * 4/1988 Levine ..................... 198/750.2

5,828,878 A * 10/1998 Bennett ....................... 718/102
(Continued)

OTHER PUBLICATIONS

Brown, "Calender Queues: A Fast 0(1) Priority Queue Implementation for the Simulation Event Set Problem", Oct. 1998, ACM, vol. 31 No. 10, pp. 1220 - 1227.*

(Continued)

*Primary Examiner*—Li B Zhen
*Assistant Examiner*—Phuong N Hoang

(57) ABSTRACT

A method and apparatus for scheduling and servicing events using a calendar structure is described. In accordance with one preferred embodiment of the present invention, a calendar structure is provided to implement work-conserving methods (for example, queuing, such as fair queuing, or, as one specific example, weighted fair queuing (WFQ)). Such a calendar structure preferably provides two slots per tier and uses a temporal pointer based on virtual time. In accordance with another preferred embodiment of the present invention, a calendar structure is provided to implement shaping of flows of information. Such a calendar structure preferably provides one slot per tier and uses a temporal pointer based on real time. For scheduling, a preferred occurrence time at which an event is preferred to occur is calculated. Events having preferred occurrence times farther from a current time value denoted by the temporal pointer are scheduled on a calendar tiers of lower resolution, while events having preferred occurrence times nearer to the current time value denoted by the temporal pointer are scheduled on calendar tiers of higher resolution. For servicing, the events are selected from slots to which the temporal pointer is pointing. If a slot is being used to schedule an event pending servicing, the slot is considered to be an occupied slot. Occupied slots at higher resolution calendar tiers are serviced exhaustively over occupied slots at lower resolution calendar tiers.

36 Claims, 12 Drawing Sheets

U.S. PATENT DOCUMENTS

| | | | |
|---|---|---|---|
| 5,835,494 A * | 11/1998 | Hughes et al. | 370/397 |
| 6,085,215 A * | 7/2000 | Ramakrishnan et al. | 718/102 |
| 6,223,201 B1 * | 4/2001 | Reznak | 718/102 |
| 6,338,130 B1 * | 1/2002 | Sinibaldi et al. | 712/35 |
| 6,553,448 B1 * | 4/2003 | Mannion | 711/2 |
| 6,646,986 B1 * | 11/2003 | Beshai | 370/230.1 |
| 6,810,043 B1 * | 10/2004 | Naven et al. | 370/412 |
| 6,964,046 B1 * | 11/2005 | Ogus et al. | 718/102 |
| 2002/0171673 A1 * | 11/2002 | Brown et al. | 345/700 |
| 2003/0050954 A1 * | 3/2003 | Tayyar et al. | 709/102 |
| 2003/0081611 A1 * | 5/2003 | Goetzinger et al. | 370/395.4 |

OTHER PUBLICATIONS

Courcoubetis, "The Complexity of Probabilistic Verification", Jul. 1995, Journal of the Association for Computing Machinery, vol. 42, No. 4, pp. 857 - 907.*

* cited by examiner

METHOD AND APPARATUS FOR SCHEDULING AND SERVICING EVENTS USING A CALENDAR STRUCTURE

RELATED APPLICATIONS

This application claims priority to U.S. Provisional Patent Application No. 60/344,935, filed on Dec. 31, 2001, and U.S. Provisional Patent Application No. 60/383,911, filed on May 29, 2002.

FIELD OF THE DISCLOSURE

The invention relates generally to communication of information and, more particularly, to allocation of traffic to a communication channel.

BACKGROUND

Information may be communicated over communication channels. The communication channels may include one or more paths between entities allowing communication of information through one or more types of communication media, for example, metallic conductors, fiber optic cables, and wireless connections. A communication channel has a finite bandwidth, i.e., only a finite amount of information may be communicated through the communication channel in a given amount of time. Information from several different sources may be communicated over a common communication channel, for example, by sequencing the information over time.

Different types of information may be subject to different communication requirements. Examples of such requirements include a minimum amount of bandwidth, a maximum permissible delay, and a maximum permissible portion of the information that is not successfully communicated. For example, a teleconferencing application may require communication of information at high bandwidth and very little delay, but may not be seriously degraded if a portion of the information is lost during communication. Another application, for example, an interactive web browsing application, may tolerate greater delay, but with little or not tolerance for lost information. As another example, a file transfer application may tolerate substantial delay, but require complete reliability of the information communicated. Thus, it is desirable to provide communication in a manner that accommodates the various communication requirements of various types of information. It is also useful to be able to fairly allocate communication resources among types of information having similar communication requirements.

Attempts have been made to use calendar structures for the allocation of information to communication channels. However, such calendar structures have generally required storing in processing large amounts of overhead information to control the communication of information through a communication channel. Such requirements have placed limits on the operating speed of the systems used to allocate information to the communication channel. Thus, scheduling and servicing techniques that avoid these disadvantages are desired.

DETAILED DESCRIPTION

Figure 1:
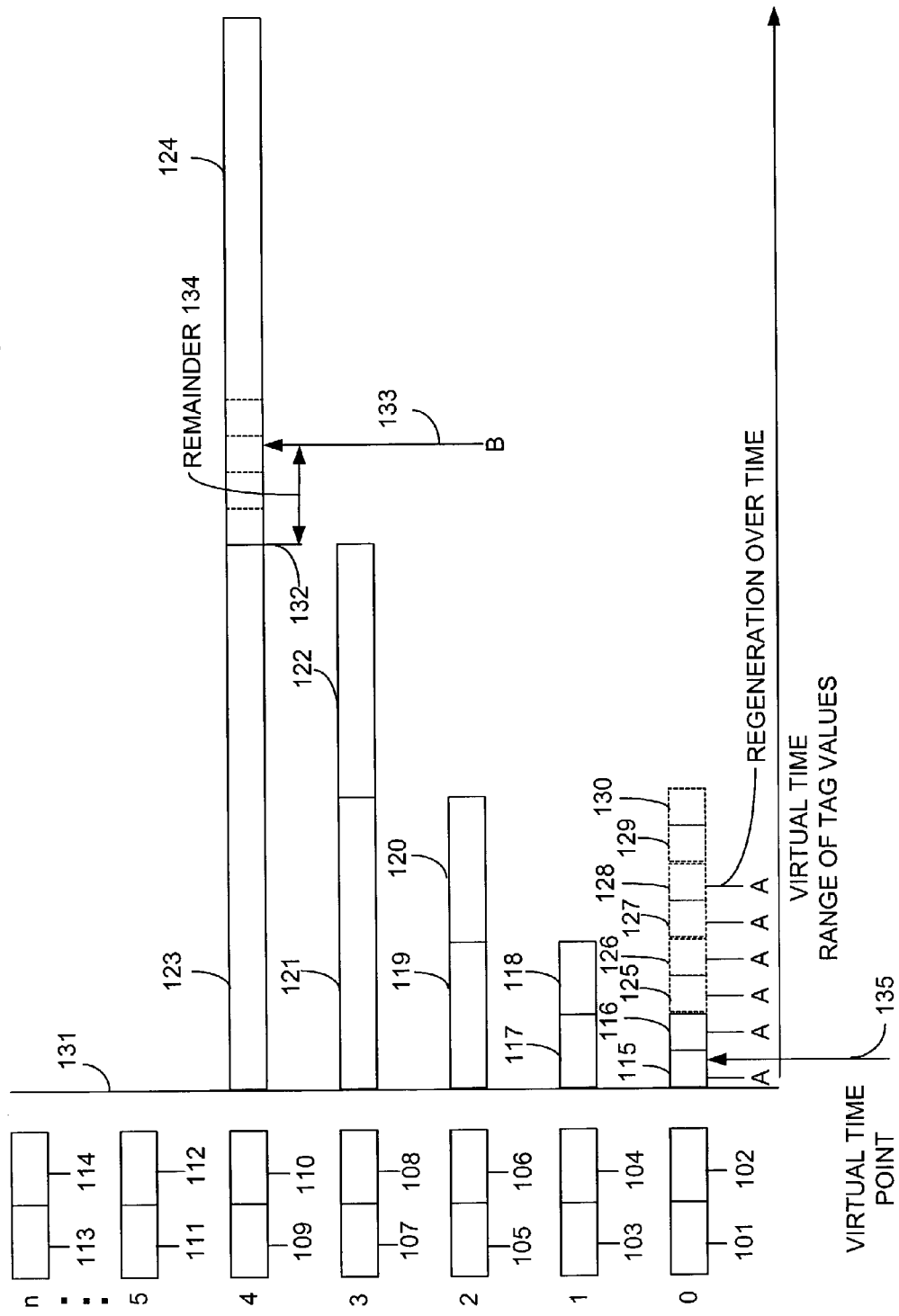
FIG. 1 is a diagram illustrating a calendar structure and the use of such a calendar structure over time in accordance with an embodiment of the invention.

A method and apparatus for scheduling and servicing events using a calendar structure is described. In accordance with one preferred embodiment of the present invention, a calendar structure is provided to implement work-conserving methods (for example, queuing, such as fair queuing, or, as one specific example, weighted fair queuing (WFQ)). Such a calendar structure preferably provides two slots per tier and uses a temporal pointer based on virtual time. In accordance with another preferred embodiment of the present invention, a calendar structure is provided to implement shaping of flows of information. Such a calendar structure preferably provides one slot per tier and uses a temporal pointer based on real time.

For scheduling, in accordance with one preferred embodiment of the present invention, a calendar structure comprising a plurality of calendar tiers having differing temporal resolution between calendar entries of different calendar tiers is provided. For each calendar tier, the calendar entries include two slots. These two slots represent the next two instances of events allocated to a particular calendar tier. A temporal pointer points to one of the slots in each calendar tier at any given time. That slot corresponds to the current time. The other slot (to which the temporal pointer is not pointing) corresponds to a time in the future dependent upon the resolution of the calendar tier.

The calendar structure described above is used for scheduling events. A preferred occurrence time at which an event is preferred to occur is calculated. Events having preferred occurrence times farther from a current time value denoted by the temporal pointer are scheduled on a calendar tiers of lower resolution, while events having preferred occurrence times nearer to the current time value denoted by the temporal pointer are scheduled on calendar tiers of higher resolution.

To cause the events to occur, the events scheduled using the calendar structure are serviced. For servicing, according to a calendar structure for implementing shaping of flows of information, the events are selected from slots to which the temporal pointer is pointing. For a calendar structure for implementing work-conserving methods, slots at which the pointer is pointing are serviced with higher priority than slots at which the pointer is not pointing, but if there are no occupied slots at which the pointer is pointing, then a slot at which the pointer is not pointing will be selected (in order of decreasing resolution). If a slot is being used to schedule an event pending servicing, the slot is considered to be an occupied slot. Occupied slots at higher resolution calendar tiers are serviced exhaustively over occupied slots at lower resolution calendar tiers. If all of the slots are occupied, the slots at higher resolution calendar tiers are serviced more frequently than the slots at lower resolution calendar tiers.

In one embodiment, the calendar structure is implemented as a bit map wherein an event is serviced if it is scheduled to a calendar entry in a calendar tier corresponding to the least significant bit of a binary representation of the temporal pointer having a given binary value. By implementing the calendar as a bit map, the calendar can be stored efficiently, without imposing large storage requirements, and the events can be serviced efficiently, without imposing large processing requirements. The following table illustrates an example of how different bits of such a bit map with six bits denoting calendar tiers over 32 current time values are accessed:

under the value will be checked. According to a preferred embodiment of the present invention useful for shaping flows of information, the servicing of a slot is performed by moving the entire contents of the slot (e.g., a pointer to one connection or a list of connections) to a "ready to send" queue from which the connections are then serviced.

In this example, in accordance with a preferred embodiment of the present invention useful for shaping flows of information, for each of the current time values of the temporal pointer, an event scheduled on a calendar tier corresponding to the least significant bit of the binary representation of the current time value having a binary value of one is serviced. At a current time value of zero, none of the bits of the binary representation of the current time value have a binary value of one, so an event scheduled on the calendar tier corresponding to B5 is serviced. If the calendar entry indicated by the temporal pointer is not occupied, it is skipped and no entry is serviced until the next time the temporal pointer is incremented (or, alternatively, the event corresponding to the next eligible calendar entry is serviced).

FIG. 1 is a diagram illustrating a calendar structure useful for implementing work-conserving methods and the use of such a calendar structure over time in accordance with an embodiment of the invention. The calendar structure includes calendar entries 101-114. The calendar entries are organized in tiers, with each tier having two slots. Calendar entries 101, 103, 105, 107, 109, 111, and 113 provide a first slot for tiers 0, 1, 2, 3, 4, 5, and n, respectively. Calendar entries 102, 104, 106, 108, 110, 112, and 114 provide a second slot for tiers 0, 1, 2, 3, 4, 5, and n, respectively.

In one embodiment of the invention, the temporal resolution of the tiers is exponentially related. As such, time spans within which events may be scheduled differ exponentially in duration between different tiers. Time spans 115, 117, 119, 121, and 123 represent the temporal resolution of the first slots of tiers 0, 1, 2, 3, and 4, respectively. Time spans 115, 117, 119, 121, and 123 begin at time 131. Time spans 116, 118, 120, 122, and 124 represent the temporal resolution of the second slots of tiers 0, 1, 2, 3, and 4, respectively. The time

TABLE 1

|    | 0 | 1 | 2 | 3 | 4 | 5 | 6 | 7 | 8 | 9 | 10 | 11 | 12 | 13 | 14 | 15 | 16 | 17 |
|----|---|---|---|---|---|---|---|---|---|---|----|----|----|----|----|----|----|----|
| B5 | * |   |   |   |   |   |   |   |   |   |    |    |    |    |    |    |    |    |
| B4 |   |   |   |   |   |   |   |   |   |   |    |    |    |    |    |    | *  |    |
| B3 |   |   |   |   |   |   |   |   | * |   |    |    |    |    |    |    |    |    |
| B2 |   |   |   |   | * |   |   |   |   |   |    |    | *  |    |    |    |    |    |
| B1 |   |   | * |   |   |   | * |   |   |   | *  |    |    |    | *  |    |    |    |
| B0 |   | * |   | * |   | * |   | * |   | * |    | *  |    | *  |    | *  |    | *  |

|    | 18 | 19 | 20 | 21 | 22 | 23 | 24 | 25 | 26 | 27 | 28 | 29 | 30 | 31 |
|----|----|----|----|----|----|----|----|----|----|----|----|----|----|----|
| B5 |    |    |    |    |    |    |    |    |    |    |    |    |    |    |
| B4 |    |    |    |    |    |    |    |    |    |    |    |    |    |    |
| B3 |    |    |    |    |    |    | *  |    |    |    |    |    |    |    |
| B2 |    |    | *  |    |    |    |    |    |    |    | *  |    |    |    |
| B1 | *  |    |    |    | *  |    |    |    | *  |    |    |    | *  |    |
| B0 |    | *  |    | *  |    | *  |    | *  |    | *  |    | *  |    | *  |

Table 1 pertains to a calendar structure for implementing shaping of flows of information (e.g., having one slot per tier). The table illustrates when the servicing of different tiers would take place (e.g., according to the exponential nature of the relative service rate between tiers (other than the two lowest resolution tiers). The entries across the top of Table 1 give examples of values of the temporal pointer (e.g., a real time value) at which the bit for the tier indicated in the column spans for each tier are repeated in time, with the time spans representing the temporal resolution of the first and second slots alternating. Time spans 125, 127, and 129 represent subsequent instances of the first slot of tier 0, while time spans 126, 128, and 130 represent subsequent instances of the second slot of tier 0. A temporal pointer 135 points to time spans 115, 117, 119, 121, and 123. Over time, this temporal pointer points to other time spans. A preferred occurrence time 133 indicates a time relative to temporal pointer 135. The preferred occurrence time 133 also indicates a remainder 134 relative to the beginning of a time span 124 within which the preferred occurrence time lies. The remainder can be used in the scheduling subsequent events, for example, communication of subsequent elements of information in a communication stream from a similar source to a similar destination. By using the remainder in such a manner, parameters relating to the frequency of events, for example, the effective data rate of a communication stream, can be controlled more precisely. That is, the resolution of calendar slots will not affect the long-term accuracy of the servicing of connections.

Figure 2:
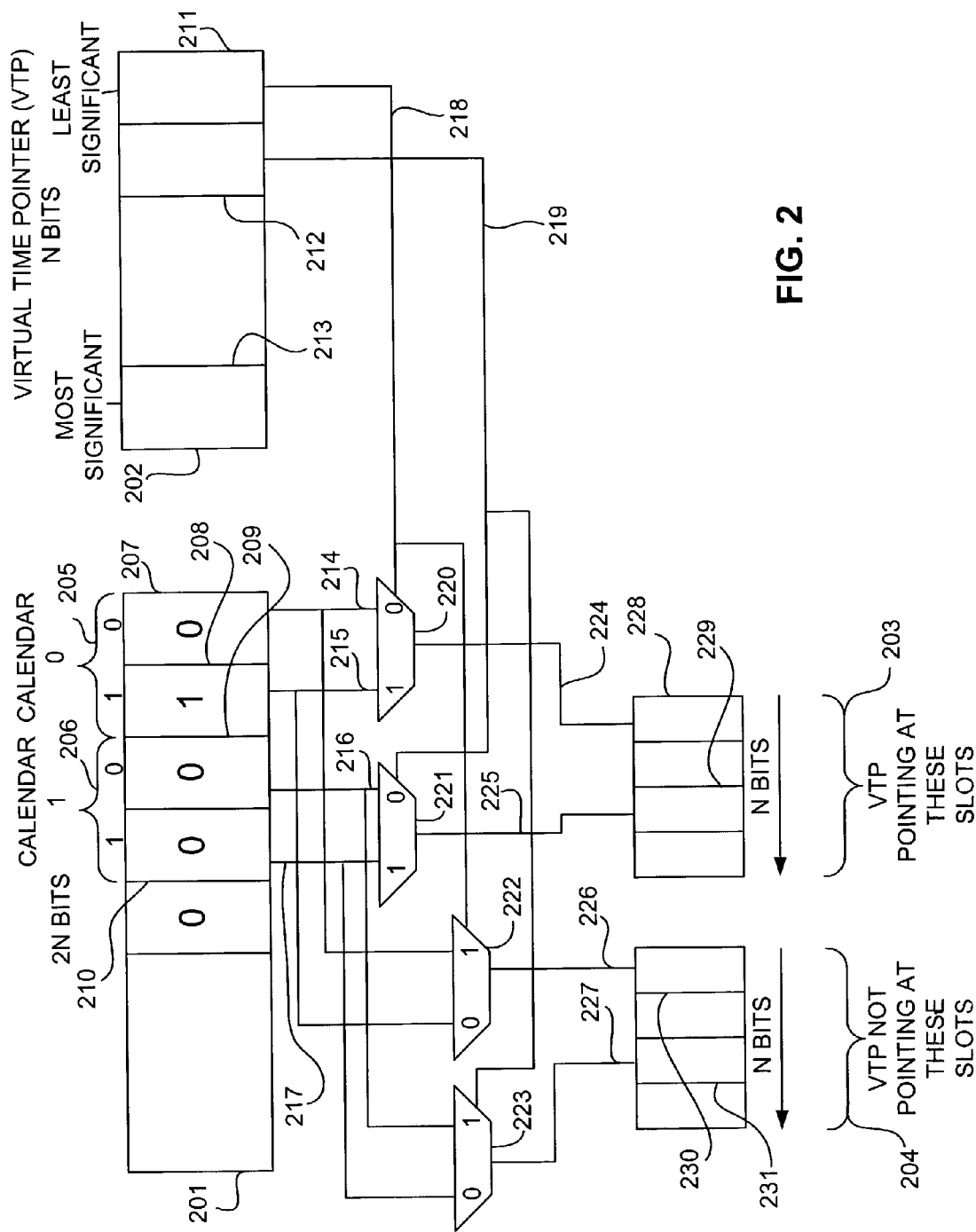
FIG. 2 is a block diagram illustrating a method and apparatus for accessing a calendar structure according to a temporal pointer in accordance with an embodiment of the invention.

FIG. 2 is a block diagram illustrating a method and apparatus for accessing a calendar structure according to a temporal pointer in accordance with an embodiment of the invention. A calendar structure 201 having a plurality of tiers 205 and 206 is implemented using a data structure wherein each tier is provided with a plurality of slots. For example, tier 205 is provided with slots 207 and 208, and tier 206 is provided with slots 209 and 210. A temporal pointer, implemented as a virtual time pointer 202, is expressed in binary form, comprising a plurality of bit registers 211, 212, and 213. In this example, bit register 211 pertains to a least significant bit, and bit register 213 pertains to a most significant bit.

A plurality of multiplexers 220-223 are provided. A bit value output 218 from bit register 211 is provided as a selection input to multiplexers 220 and 222. A bit value output 219 from bit register 212 is provided as a selection input to multiplexers 221 and 223. An output 214 of slot 207 is provided to a first input of multiplexer 220. An output 215 of slot 208 is provided to a second input of multiplexer 220 and to a first input of multiplexer 222. The output 214 is also provided to a second input of multiplexer 222. An output 216 of slot 209 is provided to a first input of multiplexer 221. An output 217 of slot 210 is provided to a second input of multiplexer 221 and to a first input of multiplexer 223. The output 216 is also provided to a second input of multiplexer 223.

For a first value of bit value output 218, multiplexer 220 selects output 214 and applies it at output 224, and multiplexer 222 selects output 215 and applies it at output 226. For a second value of bit value output 218, multiplexer 220 selects output 215 and applies it at output 224, and multiplexer 222 selects output 214 and applies it at output 226. For a first value of bit value output 219, multiplexer 221 selects output 216 and provides it at output 225, and multiplexer 223 selects output 217 and provides it at output 227. For a second value of bit value output 219, multiplexer 221 selects output 217 and provides it at output 225, and multiplexer 223 selects output 216 and provides it at output 227.

A first plurality of registers 203 are provided so as to indicate the slots at which the virtual time pointer 202 is currently pointing. The first plurality of registers 203 include registers 228 and 229. Output 224 provides a value to register 228. Output 225 provides a value to register 229. Thus, for any given value of virtual time pointer 202, information from the slots at which virtual time pointer 202 is currently pointing can be accessed readily by referring to the first plurality of registers 203.

A second plurality of registers 204 are provided so as to indicate the slots at which the virtual time pointer 202 is not currently pointing. The second plurality of registers 204 include registers 230 and 231. Output 226 provides a value to register 230. Output 227 provides a value to register 231. Thus, for any given value of virtual time pointer 202, information from the slots at which virtual time pointer 202 is not currently pointing can be accessed readily by referring to the second plurality of registers 204.

The registers referred to above need not be implemented specifically as hardware registers (e.g., synchronous devices which store values presented to them at a clock edge). Rather, registers are understood broadly to include structures and methods for gathering and/or storing information in accordance with the above-described operational structures.

Figure 3:
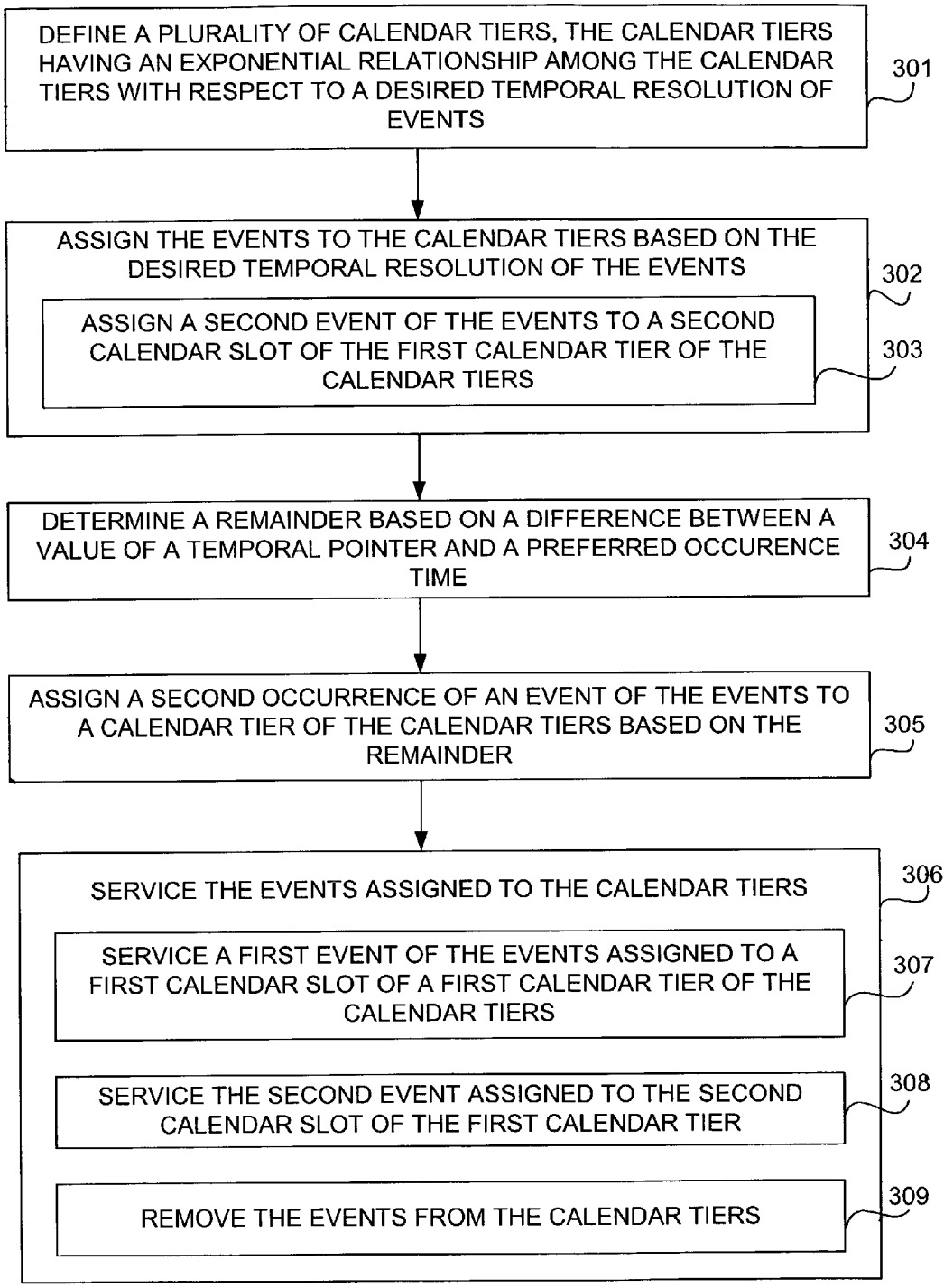
FIG. 3 is a flow diagram illustrating a method for scheduling and servicing events in accordance with an embodiment of the invention.

FIG. 3 is a flow diagram illustrating a method for scheduling and servicing events in accordance with an embodiment of the invention. In step 301, a plurality of calendar tiers are defined. In one embodiment of the invention, the calendar tiers have an exponential relationship among themselves with respect to a desired temporal resolution of events. For example, one calendar tier may be used for scheduling events within time spans of exponentially longer duration than the time spans of another calendar tier.

In step 302, the events are assigned to calendar tiers based on the desired temporal resolution of the events. Step 302 may include step 303. In step 303, a second event of the events is assigned to a second calendar slot of a first calendar tier of the calendar tiers. For example, an event may be assigned to a calendar tier based on a difference between a temporal pointer and a preferred occurrence time. Optionally, this difference may be used to determine the desired temporal resolution of the event.

In step 304, a remainder is determined based on a difference between a temporal reference point pertaining to a calendar slot to which an event is assigned and a preferred occurrence time associated with that event. In step 305, a second occurrence of an event of the events to a calendar tier of the calendar tiers based on the remainder. The second occurrence of the event may be, for example, the communication of a subsequent element of data in a communication stream from a similar source to a similar destination. By taking into consideration the remainder, the second occurrence can be assigned to the calendar tier in a manner that allows compensation for the difference between the temporal pointer and the preferred occurrence time. Thus, cumulative deviation from preferred occurrence times can be avoided.

In step 306, the events assigned to the calendar tiers are serviced. Step 306 may include step 307, 308, and/or 309. In step 307, a first event of the events assigned to a first calendar slot of a first calendar tier of the calendar tiers is serviced. In step 308, the second event assigned to the second calendar slot of the first calendar tier is serviced. In step 309, the events are removed from the calendar tiers. The events are serviced within time spans consistent with their desired temporal resolutions. The events may be removed from the calendar tiers individually or collectively.

Figure 4:
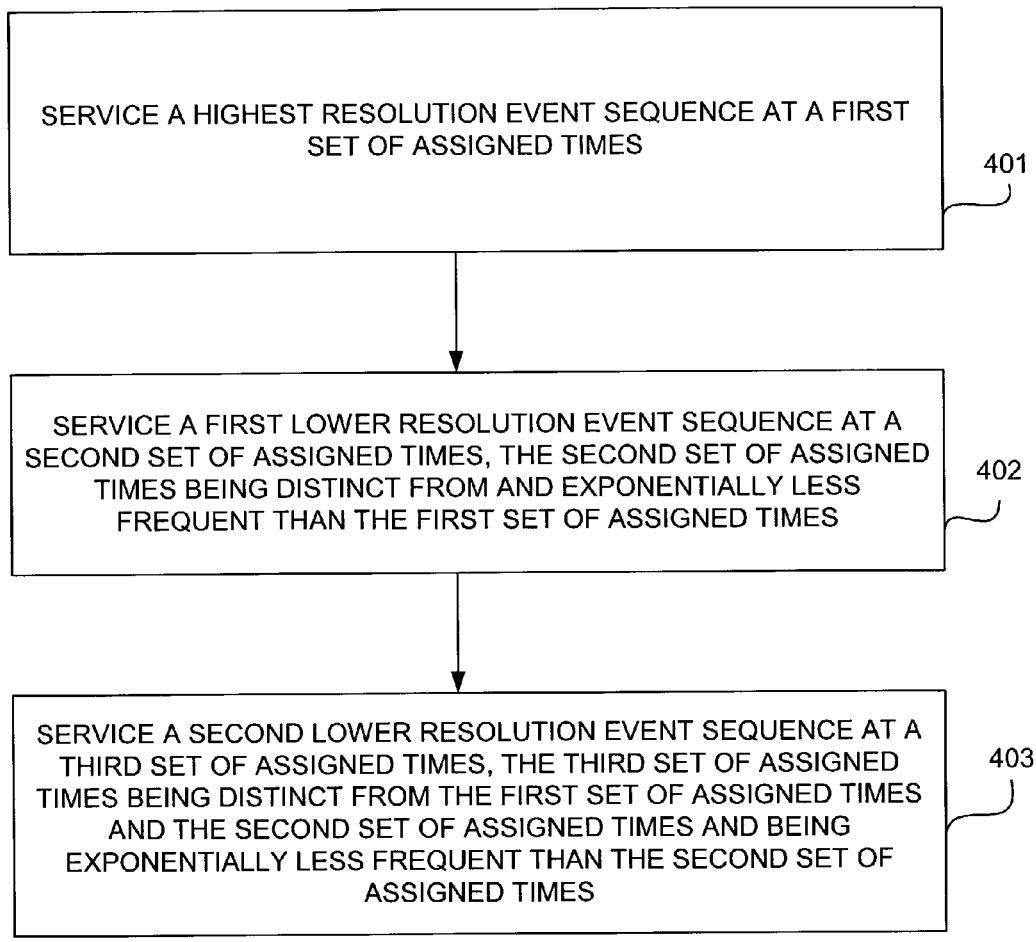
FIG. 4 is a flow diagram illustrating a method for servicing events from a calendar structure in accordance with an embodiment of the invention.

FIG. 4 is a flow diagram illustrating a method for servicing events from a calendar structure in accordance with an embodiment of the invention. In step 401, a highest resolution event sequence is serviced at a first set of assigned times. In step 402, a first lower resolution event sequence is serviced at a second set of assigned times. The second set of assigned times is distinct from and exponentially less frequent than the first set of assigned times. In step 403, a second lower resolution event sequence is serviced at a third set of assigned times. The third set of assigned times is distinct from the first set of assigned times and the second set of assigned times and is exponentially less frequent than the second set of assigned times. It should be understood that the first set of assigned times, the second set of assigned times, and the third set of assigned times can occur sequentially interspersed with each other over time. For example, an event of the first lower resolution event sequence can be serviced between the servicing of two events of the higher resolution event sequence. As another example, an event of the second lower resolution event sequence can be serviced between the servicing of two events of the first lower resolution event sequence.

Many situations exist where several sequences of events are to occur over time. Various parameters may be specified as to the relationships between the events of each sequence and between the several sequences. For example, parameters may be specified as to the rate at which the events are to occur over a relatively long period of time, the rate at which the events are to occur over shorter periods of time (e.g., the extent to which the events may occur in bursts), and the length of any delay that may elapse before an event occurs. Parameters such as these may be subject to minimal limits and/or maximal limits (as might, for example, be the case in some instances of implementing work-conserving methods). As an example of one pertinent situation, communication of information can involve the occurrence of several sequences of events over time. For example, a first communication stream from a first source to a first destination may involve a first sequence of events to communicate a first set of data elements. Likewise, a second communication stream from a second source to a second destination may involve a second sequence of events to communicate a second set of data elements.

When several sequences of events are subject to a common limitation, for example, communication through a common medium of finite bandwidth, the events need to be managed in a manner to prevent the common limitation from being exceeded. This can be accomplished by scheduling and servicing the events within the common limitation to which they are subject. Scheduling and servicing of events can be performed so as to attempt to meet certain goals. For example, one possible goal is to ensure that performance levels specified for the sequences of events are met. According to a preferred embodiment of the present invention, shaping of flows of information may be implemented to meet certain goals. Another example of a possible goal is to achieve fairness among the scheduling and servicing of the events. One way toward the goal of achieving fairness is to provide weighted fair queuing (WFQ) in accordance with an embodiment of the invention. According to a preferred embodiment of the present invention, work-conserving methods may be implemented to meet certain goals.

Events to be scheduled and serviced can be denoted by tags. From the perspective of a scheduler, the tags arrive over time and are placed in calendar slots. In one embodiment of the invention, the tags represent virtual times at which events would occur. By scheduling the events among a plurality of tiers using a hierarchy of schedulers several levels of performance can be provided. For example, different levels of bandwidth can be provided for different communication streams. In a situation where specific bandwidth allocations are guaranteed for specific communication streams, an embodiment of the invention allows those full bandwidth allocations to be maintained for those communication streams rather than reallocating unused bandwidth among other communication streams.

By scheduling in accordance with a remainder, an embodiment of the invention allows substantial uniformity in delay through the scheduling and servicing system to be provided. For example, the variation in delay between elements of a communication stream may be maintained to within one cell time, or within the duration of a time span corresponding to a calendar entry at the tier having the highest resolution.

In one embodiment of the invention, scheduling is performed based on remainders, but servicing can be done quickly using calendar slots of an exponentially organized calendar structure independently of the remainders. To schedule events, tags are calculated. The remainders are determined and appropriate calendar slots are determined. In this embodiment, the remainders are determined based on the time an event is actually serviced, which may vary. Thus, the remainder may be positive or negative depending on the variation. In an alternate embodiment, what would otherwise be considered to be a negative remainder may be treated as being zero.

While it is often desirable to minimize delay in processing events according to the scheduling and servicing system, limitations such as a maximum bandwidth limitation can require that servicing of an event be intentionally delayed. The exponentially related calendar tiers of a calendar structure in accordance with an embodiment of the invention allow such delay to be introduced be assigning such an event to a tier of lower resolution. In such a manner, exponentially related ranges of delay can be readily provided while still avoiding the need for complex calendar structures or complex control of temporal pointers.

Servicing of the events can be performed using one slot per calendar tier. Each slot can accommodate a linked list or other queue or object. When servicing occurs, the linked list, queue, or object may be passed to another scheduling entity or the event or events corresponding to the linked list, queue, or object may be caused to occur.

Figure 5:
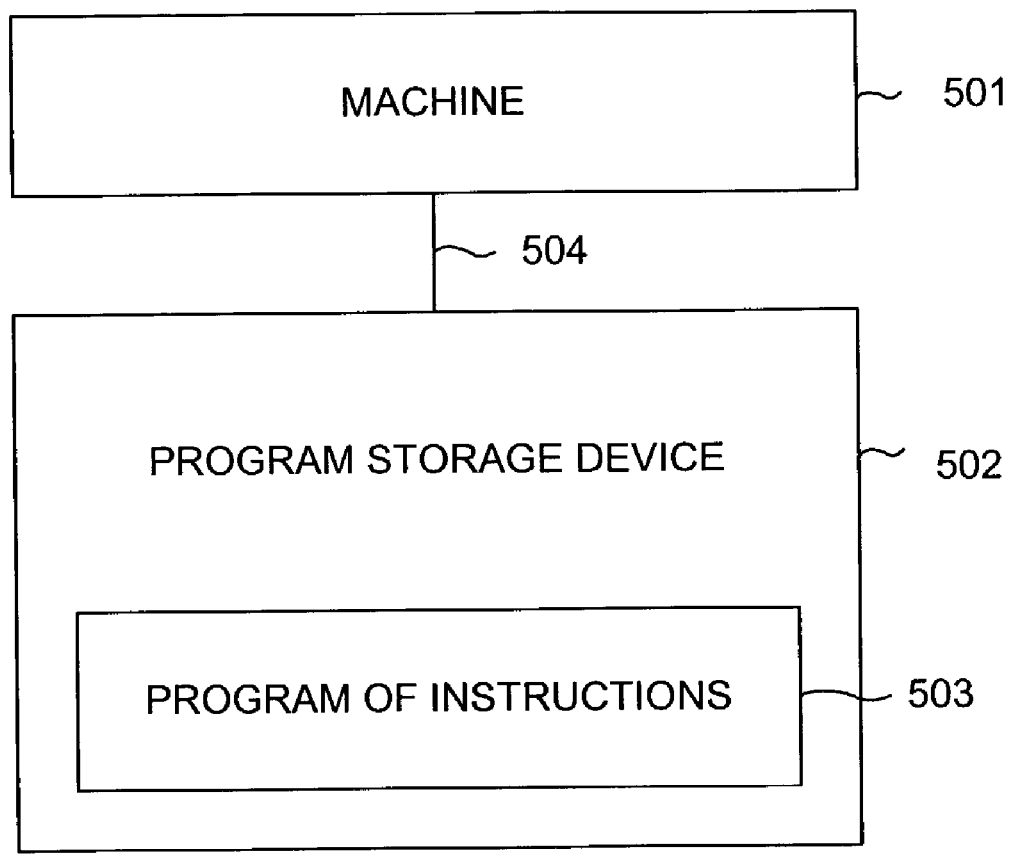
FIG. 5 is a block diagram illustrating a program storage device and a machine in accordance with an embodiment of the invention.

FIG. 5 is a block diagram illustrating a program storage device and a machine in accordance with an embodiment of the invention. Machine 501 is coupled to program storage device 502 via coupling 504. Program storage device 502 includes a program of instructions 503. The program storage device 502 is readable by the machine 501. The program storage device 502 tangibly embodies the program of instructions 503 executable by the machine 501 to perform a method of scheduling and/or servicing events. The method may include the steps recited with reference to FIG. 3 or 4 or steps recited elsewhere herein. The machine 501 may be a general-purpose computer system or a component thereof. Alternatively, the machine 501 may be specifically dedicated to performing the method steps described above.

Figure 6:
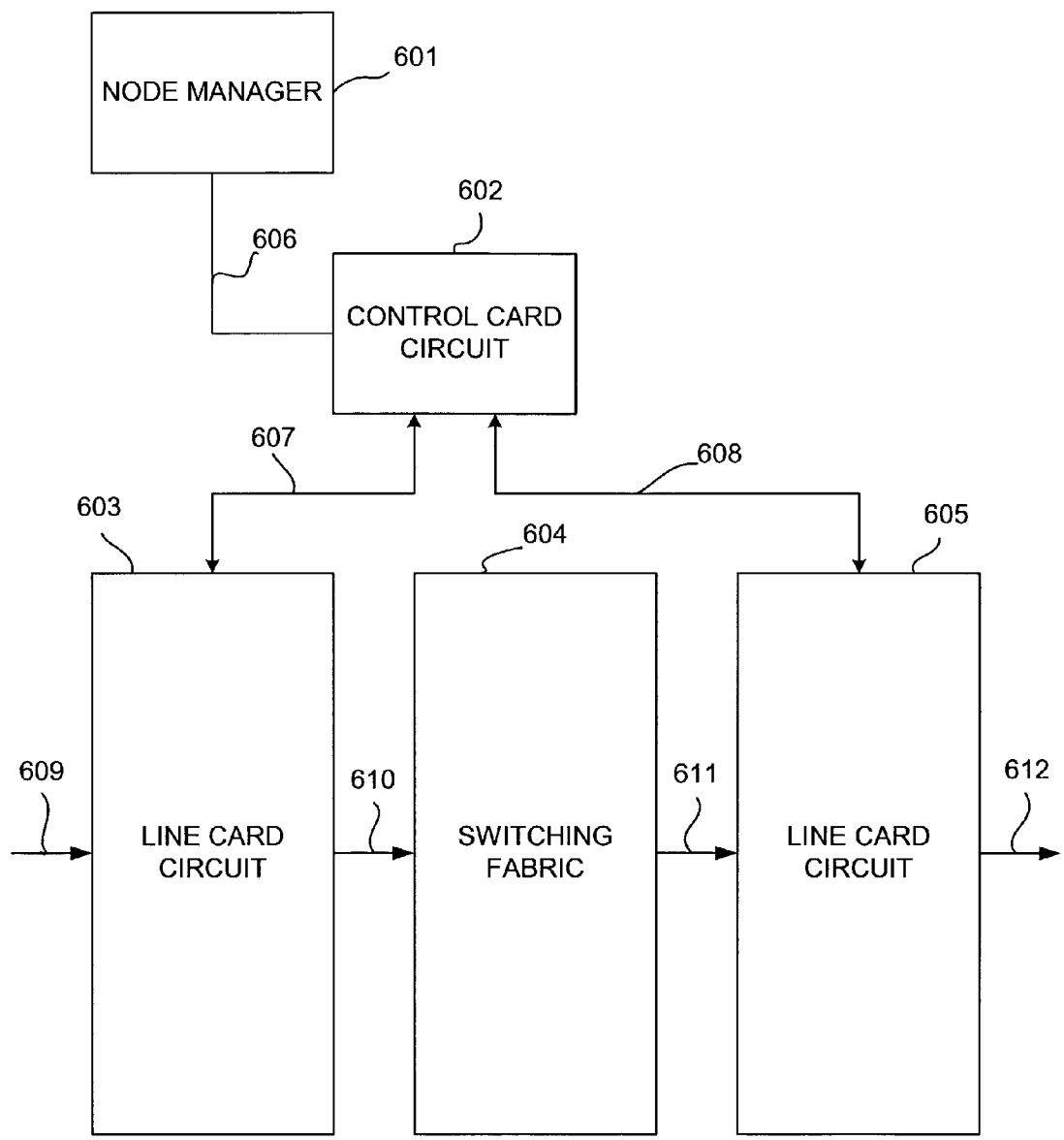
FIG. 6 is a block diagram illustrating an example of network apparatus in conjunction with which an embodiment of the invention may be implemented.

FIG. 6 is a block diagram illustrating an example of network apparatus in conjunction with which an embodiment of the invention may be implemented. The apparatus includes a node manager 601, a control card circuit 602, a line card circuit 603, switching fabric 604, and a line card circuit 605.

The node manager 601 is coupled via connection 606 to control card circuit 602 and provides control of control card circuit 602. Control card circuit 602 is coupled via connection 607 to line card circuit 603. Control card circuit 602 is coupled via connection 608 to line card circuit 605. Control card circuit 602 provides control of line card circuit 603 and line card circuit 605. A first network connection 609 is coupled to line card circuit 603. Line card circuit 603 is coupled to switching fabric 604 via connection 610. Switching fabric 604 is coupled to line card circuit 605 via connection 611. Line card circuit 605 is coupled to a second network connection 612.

Line card circuit 603 receives network data from network connection 609 and routes the data to ports of connection 610. Switching fabric 604 contains a switching matrix that routes the ports of connection 610 to the appropriate ports of connection 611. Line card circuit 605 routes the network data from the ports of connection 611 to network connection 612. While line card circuit 603, switching fabric 604, and line card circuit 605 are illustrated as being unidirectional, passing data from left to right, these elements may be configured to pass data bidirectionally.

First network connection 609, line card circuit 603, switching fabric 604, line card circuit 605, and second network connection 612 provide finite bandwidth through the network apparatus. Thus, the invention may be applied toward the scheduling and servicing of data elements of communication streams passing through components such as first network connection 609, line card circuit 603, switching fabric 604, line card circuit 605, and second network connection 612. As one example, to control the flow of communication streams through switching fabric 604, a scheduling and servicing system in accordance with the invention may be implemented in line card circuit 603. As another example, to control the flow of communication streams through second network connection 612, a scheduling and servicing system in accordance with the invention may be implemented in line card circuit 605. Alternatively, a scheduling and servicing system in accordance with the invention may be implemented elsewhere, for example, in node manager 601, control card circuit 602, and/or switching fabric 604.

A preferred embodiment of the invention may be understood more thoroughly with reference to pseudo-code for scheduling events. The term pseudo-code is used to denote generally applicable code that is limited to a specific programming language, software environment, or hardware environment. It should be noted that the values expressed in the pseudo-code are intended to be exemplary—other values may be used. In this embodiment, the calendar structure has 12 tiers, with each higher tier having double the resolution of the adjacent lower tier. The highest resolution tier is designated as tier 0, while the lowest resolution tier is designated as tier 11. A temporal pointer in the form of a virtual time pointer (VTP) is provided. Each bit of the VTP corresponds to a particular tier, i.e., VTP(i) (where $0 \leq i \leq 11$) corresponds to tier i (where $0 \leq i \leq 11$). Each tier has two entries, which may be referred to as a left entry and a right entry. When VTP(i) is 0, the VTP is pointing at the left entry of tier i, and when VTP(i) is 1, the VTP is pointing at the right entry of tier i. Thus, the VTP always points at 12 entries in different tiers at any given time.

For scheduling, a queue of events is assigned to a calendar entry based on a relationship between the VTP and a virtual theoretical emission time (VTET), which expresses a preferred occurrence time. Generally, if the value of VTET is farther from the value of VTP, the queue is assigned to a lower resolution tier, while if the value of VTET is nearer to the value of VTP, the queue is assigned to a higher resolution tier. The pseudo-code for scheduling according to an exemplary embodiment of the invention follows:

VTET: virtual theoretical emission time. It is represented by a value, for example, a 20-bit value, and its maximum resolution in this example is 1/256.

VTP: virtual time pointer. It has a value, for example, a 12-bit value, and its maximum resolution in this example is 1.

VPeriod: virtual period. It is represented by a value, for example, a 20-bit value, and its maximum resolution in this example is 1/256.

WFQRemainder: In this example, it has a 10-bit value, including a 4-bit exponent and a 6-bit mantissa. The maximum resolution in this example is 1/64.

Resolution_ser: the resolution of serviced tier.

Resolution: the resolution of the scheduling tier. In this example, the value is $\pm 2^i (0 \leq i \leq 11)$. "+" refers to VTET being scheduled on the calendar slot at which VTP is not pointing, while "−" refers to VTET being scheduled on the calendar slot at which VTP is pointing, and i denotes the number of tier.

roundup(X(n−1:0), $2^i$)($0 \leq i < n$): roundup(X(n−1:0), $2^i$)= X(n−1:0) when X(i−1:0)=0 and roundup(X(n−1:0), $2^i$)= (X(n−1:i)+1)*$2^i$ when X(i−1:0)$\neq$0.

truncate(X(n−1:0), $2^i$)($0 \leq i < n$): truncate(X(n−1:0), $2^i$)= X(n−1:i)*$2^i$.

When service and the queue is not empty, update WFQRemainder depending on the position of

---

VTP.
if ("Service" and "Queue is not empty") then
    WFQRemainder = WFQRemainder − (VTP − truncate(VTP,
    resolution_ser)) & "000000"
else
    WFQRemainder = 0
end if

---

When rescheduling or scheduling, if the queue will be scheduled on the WFQ calendar, calculate VTET.

--- if rescheduled or schedule on WFQ calendar
    VTET = VTP & "00000000" +
    WFQRemainder & "00" + VWFQPeriod
end if

---

Choose the calendar on which the queue should be scheduled.

---

VTET_sch = VTET(19:8)
if VTET_SCH > = VTP + 1 then
    delta = VTET_SCH − VTP
    if (delta<2) then
        resolution =$2^0$
        -- schedule on tier 0
    else if (delta <$2^2$) then
        if VTP(1) = not VTET_SCH(1) then
            resolution = $2^1$
            -- schedule on tier 1
        else
            resolution = $2^2$
            -- schedule on tier 2
        end if
    else if (delta < $2^k$) then -- where k = 3, 4, 5, ..., 10
        if VTP(k−1) = not VTET_SCH(k−1) then
            resolution = $2^{k-1}$-- schedule on tier k−1
        else
            resolution = $2^k$
        -- schedule on tier k
        end if
elseif (delta < $2^{11}$) then
    if VTP(10) = not VTET_SCH(10) then
        resolution = $2^{10}$
        -- schedule on tier 10
    else
        resolution = $2^{11}$
        -- schedule on tier 11
    end if
elseif (delta < $2^{12}$) then
    resolution = $2^{11}$
end if
else
    resolution = −resolution_ser
end if
WFQRemainder_new = roundup(VTET − truncate(VTET, resolution), $2^2$)
    -- WFQRemainder_new will be stored in the memory and will be used to
calculate VTET at next service event.

Determine which bit in the bitmap the scheduled queue is on.

```
If resolution = -2^i and VTP(i) = 0 then -- (0≦i≦11)
    Schedule on the left entry of tier i which is corresponding to bitmap
    iL
Else if resolution = -2^i and VTP(i) = 1 then -- (0≦i≦11)
    Schedule on the right entry of tier 0 which is corresponding to bitmap
    iR
Else if resolution = 2^i and VTP(i) = 0 then -- (0≦i≦11)
    Schedule on the right entry of tier i which is corresponding to bitmap
    iR
Else if resolution = 2^i and VTP(i) = 1 then -- (0≦i≦11)
    Schedule on the left entry of tier i which is corresponding to bitmap
    iL
End if
```

A preferred embodiment of the invention, which may, for example, be useful for implementing work-conserving methods, may be understood more thoroughly with reference to pseudo-code for servicing events. It should be noted that the values expressed in the pseudo-code are intended to be exemplary—other values may be used. For servicing, an appropriate queue of events is selected from among the calendar entries. A queue is selected from occupied calendar entries at which the VTP is pointing over entries at which the VTP is not pointing. The higher resolution occupied calendar entries are serviced exhaustively over the lower resolution occupied calendar entries. The servicing is performed to select an appropriate entry in the bitmap of a given calendar.

First, the entries at which the VTP is pointing are chosen. Since each bit of VTP corresponds to a tier in a calendar structure, and VTP will be pointing at a number of calendar entries equal to the number of tiers in the calendar structure (e.g., 12) at any time. If bit x of VTP is 0, the left entry of the tier x is selected; and if bit x of VTP is 1, the right entry of tier x is selected. (The terms "left" and "right" are used to distinguish conveniently between two calendar entries of a tier, but need not imply a directional relationship between the calendar entries.)

When some entries at which the VTP is pointing are occupied, the occupied slots are serviced exhaustively from highest resolution to lowest resolution. The following pseudo-code expresses such servicing:

```
for i in 0 to 11 loop
    If (VTP(i) = 0) then
        B(i) = BiL
    else
        B(i) = BiR
    end if
end loop
```

The least significant "1" from B(11:0) is chosen and the serviced entry is further selected by the VTP bit.

If the entries at which VTP is pointing are all empty, VTP is jumped to the closest occupied slot. The following pseudo-code expresses this:

```
for i in 0 to 11 loop
    If (VTP(i) = 0) then
        B(i) = BiR
    else
        B(i) = BiL
    end if
end loop
```

The least significant "1" from B(11:0) is chosen, the VTP corresponding bit is inverted, and the serviced entry is further selected by the VTP bit.

Before each service or after each reschedule, if the VTP is not pointing at the end of any occupied slots, the VTP is incremented by 1.

A preferred embodiment of the invention, which may, for example, be useful for implementing shaping of flows of information, may be understood more thoroughly with reference to pseudo-code for scheduling events according to that alternate embodiment. A theoretical emission time (TET) is calculated. A queue of events to be scheduled is assigned to a calendar slot according to a relationship between the TET and a real time pointer (RTP). In this example, both RTP and TET are 23-bit values and the shaper calendar bitmap is 24 bits. (It should be noted that the values expressed in the pseudo-code are intended to be exemplary—other values may be used.) The pseudo-code for scheduling follows:

```
Delta = TET - RTP
if Delta ≦ 1 then
    TET_SCH = TET
    Count the number (n) of LSB zeros of TET_SCH after the rightmost leading "1" then Bn
    = '1'
elseif Delta ≦ 2 then
    TET_SCH = round_up (TET, 2)
    Count the number (n) of LSB zeros of TET_SCH after the rightmost leading "1"
    then Bn = '1'
elseif Delta ≦ 2^2 then
    TET_SCH = round_up (TET, 2^2)
    Count the number (n) of LSB zeros of TET_SCH after the rightmost leading "1"
    then Bn = '1'
elseif Delta ≦ 2^3 then
    TET_SCH = round_up (TET, 2^3)
    Count the number (n) of LSB zeros of TET_SCH after the rightmost leading "1"
    then Bn = '1'
...
elseif Delta ≦ 2^k then (3 < K < 21)
    TET_SCH = round_up (TET, 2^k)
    Count the number (n) of LSB zeros of TET_SCH after the rightmost leading "1"
    then Bn = '1'
```

-continued

```
...
elseif Delta ≤ 2²¹ then
    TET_SCH = round_up (TET, 2²¹)
    Count the number (n) of LSB zeros of TET_SCH after the rightmost leading "1"
        then Bn = '1'
else TET_SCH = round_up (TET, 2²²)
    Count the number (n) of LSB zeros of TET_SCH after the rightmost leading "1"
        then Bn = '1'
end if
```

A preferred embodiment of the invention which may, for example, be useful for implementing shaping of flows of information, may be understood more thoroughly with reference to the following pseudo-code for servicing events (it should be noted that the values expressed in the pseudo-code are intended to be exemplary—other values may be used):

If RTP (0)=$2^0$, then check Bit0 of the shaper calendar bitmap;

If RTP (1:0)=$2^1$, then check Bit1 of the shaper calendar bitmap;

If RTP (2:0)=$2^2$, then check Bit2 of the shaper calendar bitmap;

. . .

if RTP (n:0)=$2^n$, then check Bit n of the shaper calendar bitmap;

. . .

if RTP (22:0)=$2^{22}$, then check Bit 22 of the shaper calendar bitmap;

if RTP (22:0)=0, then check Bit 23 of the shaper calendar bitmap;

The present invention is advantageous in that it requires minimal storage space, which results in several benefits. For a given amount of storage space, a large number of calendars can be stored. Consequently, many schedulers can be implemented. Such schedulers may be implemented hierarchically. The schedulers can use a queuing technique such as WFQ, round robin queuing, or weighted round robin queuing. A preferred fair queuing technique is described in A Self-Clocked Fair Queuing Scheme for Broadband Applications by S. J. Golestani, Proceedings of IEEE INFOCOM '94, April 1994, pages 636-646. The efficiency of storage space allows many ports, classes, and/or aggregates to be provided.

Another advantage of the small amount of storage space needed is that faster storage technology may be used. Generally, faster storage devices tend to have smaller capacity as compared with slower storage devices. The ability to utilize faster storage devices allows higher speed operation of the scheduling and servicing system.

The present invention is also advantageous in that it allows simple selection of calendar slots. Simple selection of a calendar slot without the need for complex calculation or other elaborate processing steps allows faster overall operation of the scheduling and servicing system.

Work-conserving disciplines may be implemented with the use of scheduling calendars. Since calendars have finite resolutions, theoretical emission times that determine the positions of frames within the slots are preferably rounded to match the boundaries of the slots. Embodiments of the invention may be practiced with a variety of rounding techniques. The selection of a rounding technique can affect the performance of a work-conserving discipline. Examples of several rounding techniques with which the invention may be practiced are described below.

Introduction

Networks are preferably configured to support multiple service categories that include real-time services and best-effort services. Different treatment at the switches is preferably provided for streams belonging to different service categories. Performance of real-time applications is usually dependent upon timely delivery of frames and delay variations (jitter). Timing constraints imposed on applications using best-effort services are more relaxed. Such applications benefit from the available, excess bandwidth.

In both types of applications, it is usually important to differentiate between the requirements of different streams, and allow for an appropriate distribution of resources among them. Work-conserving service disciplines, modeled on a Generalized Processor Sharing (GPS) method, have been designed for this purpose. With such disciplines, a server is engaged in active processing and kept from being idle when there is a frame to send. Some notable examples of work conserving-service disciplines, which may be better understood with reference to Zhang, H., "Service Disciplines for Guaranteed Performance Service in Packet-Switching Networks", Proc. IEEE, vol. 83, no. 10, October 1995, include the following: delay earliest-due-date (delay-EDD), virtual clock, fair queuing (FQ) and its weighted version (WFQ) also called packetized generalized processor sharing (PGPS), self-clocked fair queuing (SCFQ), and worst-case fair weighted fair queuing ($WF^2Q$). Delay earliest-due-date (delay-EDD) may be better understood with reference to Ferrari, D. and Verma, D., "A scheme for real-time channel establishment in wide-area networks", IEEE J. Selected Areas in Commun., vol. 8, pp. 368-379, April 1990, and/or Kandlur, D., Shin, K. and Ferrari, D., "Real-time communication in multi-hop networks", Proc. 11$^{th}$ Int. Conf. Distributed Computer Syst., May 1991. Virtual clock may be better understood with reference to Zhang, H., "Virtual clock: a new traffic control method for packet switching networks", Proc. ACM SIGCOMM '90, Philadelphia, Pa., September 1990, pp. 19-29. Fair queuing (FQ) may be better understood with reference to Demers, A., Keshav, S. and Shenker, S., "Analysis and simulation of a fair queuing algorithm", J. Internetworking Res. And Experience, pp. 3-26, October 1990. Weighted version (WFQ) also called packetized generalized processor sharing (PGPS) may be better understood with reference to Parekh, A. and Gallager, R., "A generalized processor sharing approach to flow control—the single node case", Proc. INFOCOM '92, 1992. Self-clocked fair queuing (SCFQ) may be better understood with reference to Golestani, S., "A self-clocked fair queuing scheme for broadband applications", Proc. IEEE INFOCOM '94, Toronto, ON, June 1994, pp. 636-646. Worst-case fair weighted fair queuing ($WF^2Q$) may be better understood with reference to Bennett, J. C. R. and Zhang, H., "$WF^2Q$: Worst-case fair weighted fair queuing", Proc. IEEE INFOCOM'96, pp. 120-128, San Francisco, Calif., March 1996.

In weighted work conserving-service disciplines, the amount of bandwidth allocated to a stream depends on its weight. A queue calendar, for example, one as described in Brown, R., "Calendar queues: A fast o(1) priority queue implementation for the simulation event set problem", *Comm. of the ACM,* 31(10):1220-1227, October 1988, is a practical example of a discipline implementation. A preferred calendar structure is described in more detail herein.

In accordance with at least one embodiment of the invention, a work conserving-service discipline calculates a theoretical emission time (TET). The TET is preferably calculated for every frame that arrives at the system, and its value depends on the weight of the stream to which the frame belongs (e.g., a frame's weight). Depending on the TET, the frame is placed in one of the slots into which a calendar is divided.

If the system processes only one stream, then the frame will preferably be processed immediately—as mentioned above, the system is engaged in active processing and kept from being idle when there is a frame to send. If the system shares its resources with other streams, on the other hand, the order in which the frames will be processed will preferably depend on their relative weights. These weights determine the values of TET, and different values of TET are likely to place frames in different slots.

Calendar resolution is finite. Consequently, when a frame is scheduled, its TET value is likely to be between the boundaries of a slot, rather than exactly at one of its boundaries. In such a case, the TET is rounded up (or down) to the nearest slot boundary.

Any of several methods of rounding the TET may be employed, although different methods may result in different implementation complexity, as well as differences in service differentiation between streams of different weights. Such methods may be selected to assure that the low-weight traffic does not interfere with high-weight traffic.

A description of an example of a structure of a calendar and its processing is set forth below. Then, four examples of rounding methods are described. Subsequently, comparisons of the examples are provided. Following the comparisons, an analytical explanation of observations pertaining to the comparisons is provided.

Calendar Processing

Figure 7:
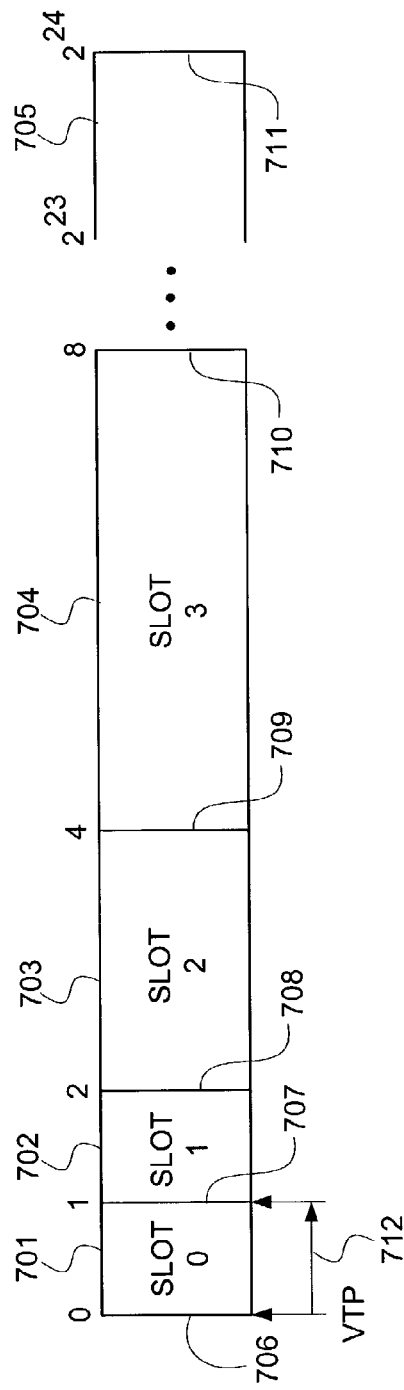
FIG. 7 is a diagram illustrating an example of a structure of a calendar in accordance with an embodiment of the invention.

FIG. 7 is a diagram illustrating an example of a structure of a calendar in accordance with an embodiment of the invention. The slots are defined along axis 712, which the virtual time pointer (VTP) traverses. Slots 0, 1, 2, and 3 are denoted by reference numerals 701, 702, 703, and 704, respectively. The left boundary of slot 0 is represented by reference numeral 706. The right boundary of slot 0, which is also the left boundary of slot 1, is represented by reference numeral 707. The right boundary of slot 1, which is also the left boundary of slot 2, is represented by reference numeral 708. The right boundary of slot 2, which is also the left boundary of slot 3, is represented by reference numeral 709. The right boundary of slot 3 is represented by reference numeral 710. The slots continue over a defined range (e.g., $2^{24}$ in the illustrated example), ending with a rightmost slot 705, which has a right boundary 711. Slots 0 and 1 have identical sizes, while each consecutive slot is twice as big as the previous slot. Specifically, the $0^{th}$ slot is for $0<TET\leq2^0=1$, the $1^{st}$ slot is for $1=2^0<TET\leq2^1=2$, the $2^{nd}$ slot is for $2=2^1<TET\leq2^2=4$, the $3^{rd}$ slot is for $4=2^2<TET\leq2^3=8$, etc. Formally, the relation between slot number $N_s$ and TET is as follows:

$$2^{N_s-1}<TET\leq2^{N_s} \text{ for } N_s\geq1, \text{ and}$$

$$0<TET\leq1 \text{ for } N_s=0$$

The calendar has a finite resolution. Consequently, the TET of a frame being scheduled may place that frame anywhere between the slot boundaries. Depending on the rounding method used, the TET is rounded down or up to the boundary of a slot.

For example, assume that for some frame, TET=1.2, and that TET is always rounded up to the right boundary slot. Since TET is between 1 and 2, which are the boundaries of slot 1, it is rounded up by 0.8 and scheduled in slot 1.

A VTP moves in increments of one unit, removing the scheduled frames from the current slot. In this context, "unit" corresponds to the size of the slot of the highest resolution. In other words, a "window" of width equal to the size of slot 0 moves on the calendar. Frames "visible" through this window are removed from the calendar.

Consecutive slots in a calendar have different (e.g., increasing) sizes (see FIG. 7). Although this design decreases resolution of the calendar, it also increases the range of TET values that can fit in the calendar. For example, assume there are two frames with TETs 5 and 7. The first frame has a greater weight because its TET is smaller. However, both frames are scheduled in the same slot 3. If the slots had equal sizes of 1, the second frame would be scheduled in the slot closer to the right boundary of a calendar, giving the first frame a higher priority.

Advantageously, such a configuration provides increased range of TET values that can fit in the calendar, as well as easier implementation. The calendar from FIG. 7 can accommodate frames whose $TET\leq2^{24}$ using just 25 slots. A calendar with equal-size slots would require $2^{24}$ slots to provide similar capacity.

Note also that a poor resolution (e.g., $2^{22}$) is only experienced with respect to frames whose values of TET are very large. High-weight frames, whose scheduling precision is particularly important, have small values of TET and are scheduled in high-resolution slots.

Rounding Methods

Initially, TET is determined by the value $T_{inc}$ that we will call an increment. $T_{inc}$ depends on the weight of a stream to which a given frame belongs. With the increasing weight of a stream, $T_{inc}$ decreases, allowing frames to be scheduled in slots of higher resolution (i.e., slots of smaller sizes). Such frames will be reached by the virtual time pointer earlier and, therefore, they will be processed ahead of relatively less important frames with lower weights.

Depending on the rounding method, $T_{inc}$ may be decreased or increased by a round-up or round-down value used in the calculation of TET for the previous frame (see below). This modified value of $T_{inc}$ will be called the initial theoretical emission time, and denoted by $TET_{init}$. Since the value of $TET_{init}$ may place the frame anywhere between the boundaries of some slot, $TET_{init}$ will be rounded down (or up, again depending on the used method) to the nearest boundary of a slot. This rounded value of $TET_{init}$ finally becomes a theoretical emission time and determines a slot in which a frame is to be scheduled.

Thus, several types of rounding methods may be practiced in accordance with the present invention, including an up-down rounding method, a down-up rounding method, an up-only rounding method, and a down-only rounding method. Details are provided in subsections below.

Up-Down Rounding Method

Figure 12:
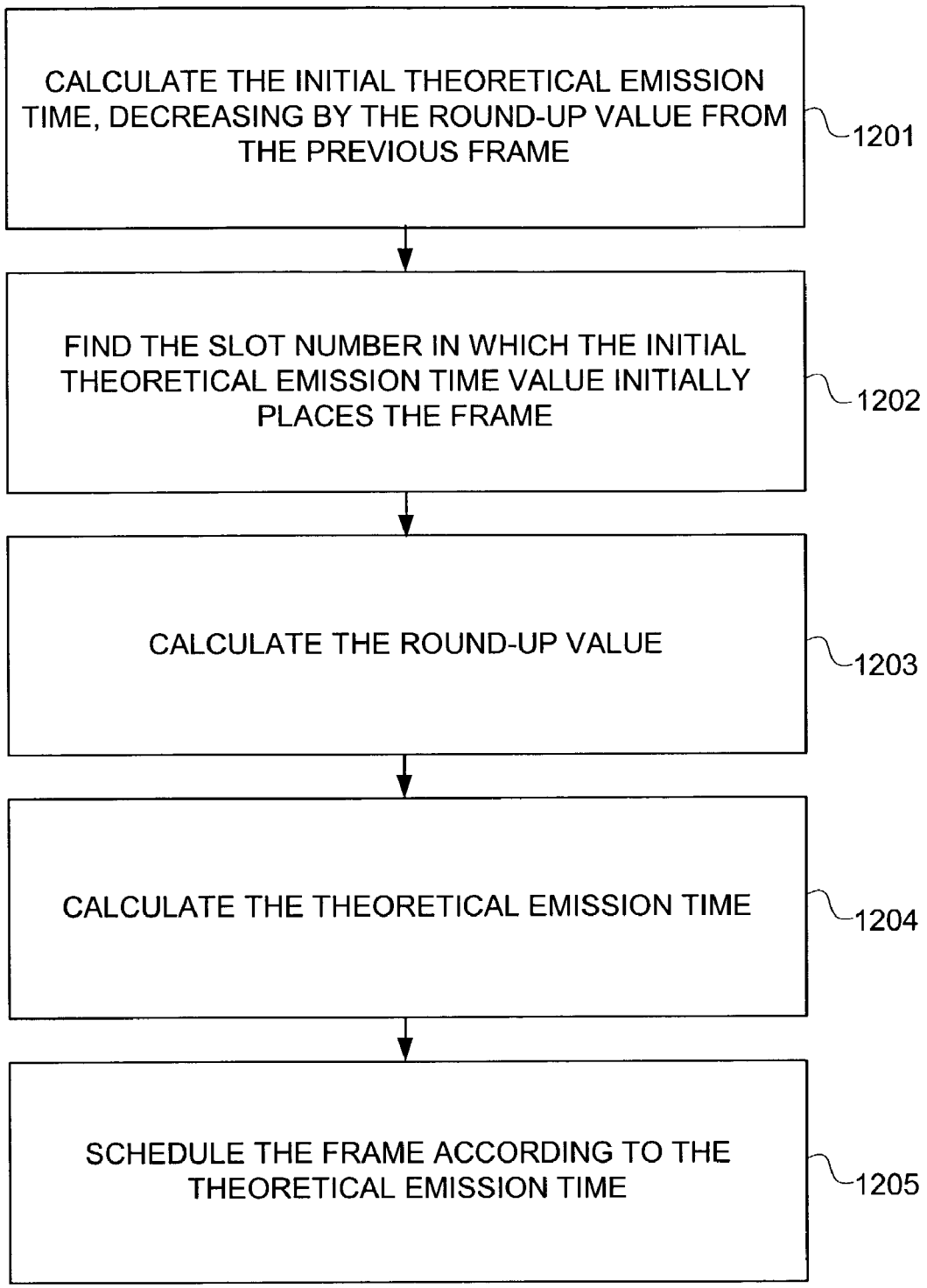
FIG. 12 is a flow diagram illustrating an example of the up-down rounding method.

FIG. 12 is a flow diagram illustrating an example of the up-down rounding method. This example can be described as follows:

---

Let $R_p = R_c = 0$, and $T_{inc}$ be an increment of a given frame.
As long as there is a supply of frames, repeat the following process:
    Calculate the initial theoretical emission time:
        $TET_{init} = T_{inc} - R_p$
    Find the slot number $N_s$ in which this $TET_{init}$ value initially places the frame:
        $N_s = \lceil \log_2 TET_{init} \rceil$ for $TET_{init} \geq 1$, or
        $N_s = 0$, for $TET_{init} < 1$
    Calculate the round-up value $R_c$:
        $R_c = 2^{N_s} - TET_{init}$
    Calculate theoretical emission time:
        $TET = TET_{init} + R_c = 2^{N_s}$
    The frame is scheduled in slot $N_s$.
    The $TET_{init}$ of the next frame will be decreased by the round up value $R_p$ used in scheduling of this frame:
        $R_p = R_c$

---

Initially, in step 1201, the increment of the frame being scheduled on the calendar is decreased by $R_p$, the value used to round up TET in the previous calculation ($R_p$ is set to 0 for the first frame). Then, in step 1202, the method finds slot number $N_s$ for the calculated value $TET_{init}$ (FIG. 7 and the accompanying description provide additional information regarding the logarithmic formula for the slot number). In the next step, step 1203, the method determines $R_c$ to indicate how far the $TET_{init}$ is from the right boundary of slot $N_s$. As described above, in this example, the boundaries of slot $N_s$ are $2^{N_s-1}$ and $2^{N_s}$. Then, in step 1204, the theoretical emission time is calculated and the frame is scheduled in slot $N_s$. In step 1205, the frame is scheduled to be processed according to the theoretical emission time as calculated in step 1204.

Preferably before the theoretical emission time for the next frame is calculated, the round-up value $R_c$ is assigned to $R_p$ that will be used to round the initial value of TET in the iteration for the next frame.

Figure 8:
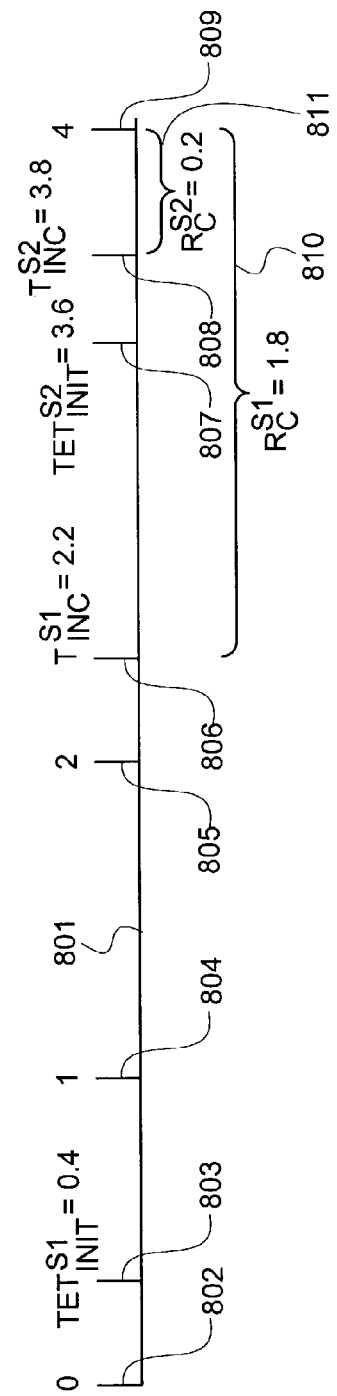
FIG. 8 is a diagram illustrating an example of an up-down rounding method that may be used in accordance with an embodiment of the invention.

FIG. 8 is a diagram illustrating an example of an up-down rounding method that may be used in accordance with an embodiment of the invention. The fairness that is an advantage of the up-down rounding method may be understood by reference to FIG. 8. Slots are defined relative to axis 801. Slot 0 exists between boundary 802 and boundary 804. Slot 1 exists between boundary 804 and 805. Slot 2 exists between boundary 805 and 809. An initial theoretical emission time 803 for a first stream s1 is illustrated as having a value of 0.4. An increment 806 for the first stream s1 is illustrated as having a value of 2.2. An initial theoretical emission time 807 for a second stream s2 is illustrated as having a value of 3.6. An increment 808 for the second stream s2 is illustrated as having a value of 3.8. As illustrated in FIG. 8, the two streams s1 and s2 with weights w1 and w2 and increments $T_{inc}^{s1}=2.2$ and $T_{inc}^{s2}=3.8$ are shown. The increment of stream s1 is less than the increment of stream s2, which means that w1>w2. Although w1>w2, frames from both streams will be scheduled in the same slot. However, the method will give frames from stream s1 a chance to be scheduled in a slot of higher resolution than s2, thereby differentiating between the two streams.

The round-up value 810 of stream s1 is $R_c^{s1}=1.8$, and the round-up value 811 of stream s2 is $R_c^{s2}=0.2$, as illustrated in FIG. 8. The up-down rounding method will use these values, as $R_p=R_c$, in calculation of TET for the next frame from these streams. Thus, initial theoretical emission times of the next frames from s1 and s2 are $TET_{init}^{s1}=0.4$, and $TET_{init}^{s2}=3.6$. Rounded-up, $TET^{s1}=1$ and $TET^{s2}=4$, which will place the frame from stream s1 in slot 0 and the frame from stream s2 again in slot 2.

Thus, in the long run, this method will differentiate between frames of different weights, allowing frames with higher weights (and smaller increments) to be scheduled in slots of higher resolution.

The round-up value used in one calculation is retained and reused in the next calculation. The up-down rounding method (as well as the down-up rounding method presented below) rounds up or down the initial values of theoretical emission time not only because of a finite resolution of the calendar. Every time $TET_{init}$ for some frame is increased (rounded up), its weight is effectively decreased. That gives other frames with possibly lower weights an unfair advantage over such a frame. Since the round-up value is subtracted from $TET_{init}$ for the next frame, thereby increasing its weight, the stream is able to regain the lost weight.

Thus, the presented method allows preserving the weights of the streams, represented in the scheduler by values of $T_{inc}$. Particular values of theoretical emission time TET may vary from the prescribed $T_{inc}$ due to the limited resolution of the calendar but in the long term, the average TET is equal to $T_{inc}$.

The up-down rounding method may be somewhat more complex than other methods since the previously used round-up value is stored for use in the next calculation, and several addition and subtraction operations are performed for each frame. Also, care should be taken to minimize interference with frames scheduled in high-resolution slots. For example, a frame with a high $T_{inc}$ (i.e., low weight) may be scheduled in high-resolution slots, interfering with high-weight frames. Such interference should preferably be minimized or avoided as it may, for example, increase the jitter of delay-sensitive, high-weight frames.

Down-Up Rounding Method

Figure 13:
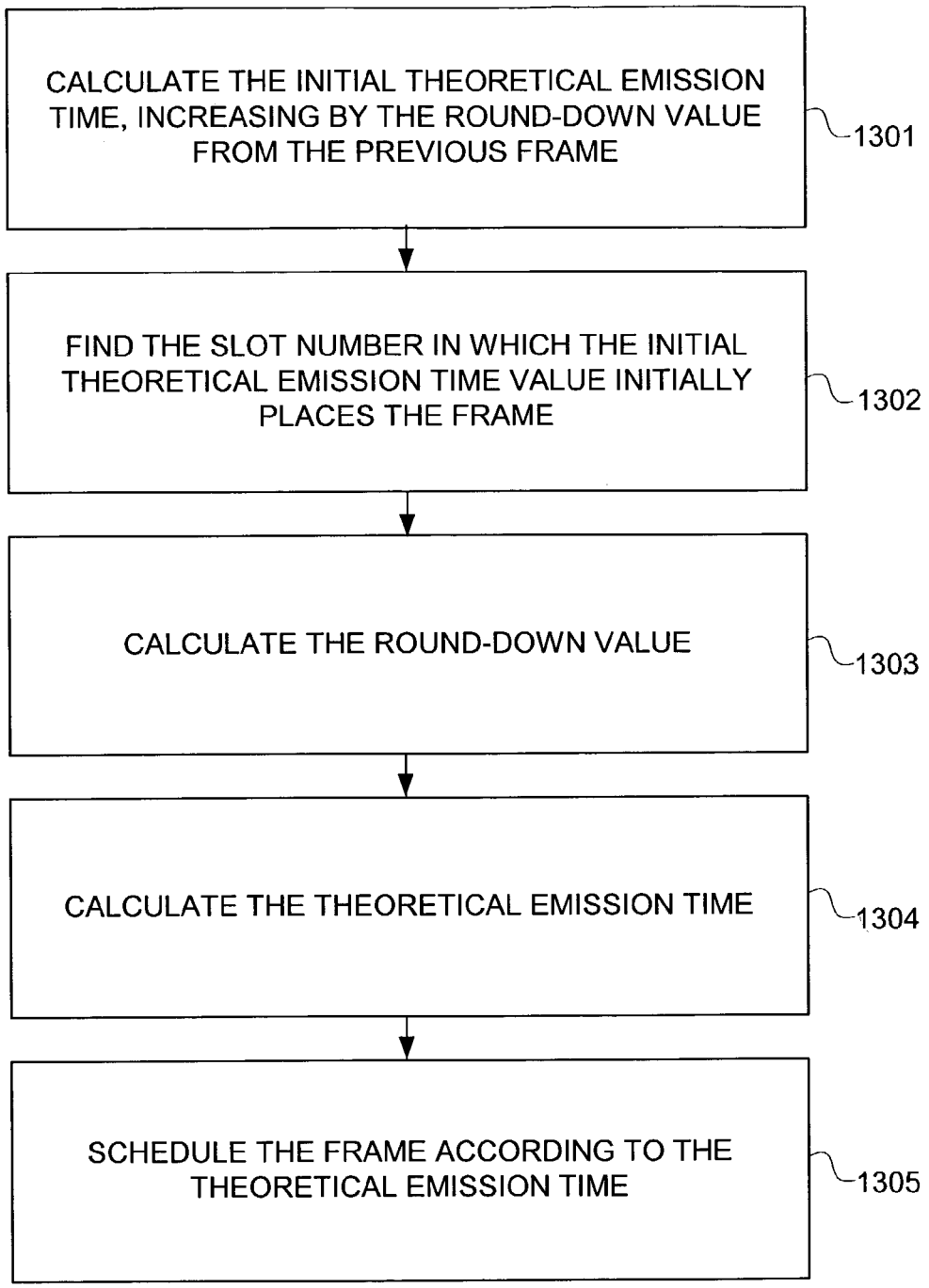
FIG. 13 is a flow diagram illustrating an example of the down-up rounding method.

FIG. 13 is a flow diagram illustrating an example of the down-up rounding method. The down-up rounding method could be viewed as the up-down rounding method reversed. The example of the down-up rounding method illustrated in FIG. 13 may be described as follows:

---

Let $R_p = R_c = 0$, and $T_{inc}$ be an increment of a given frame.
As long as there is a supply of frames, repeat the following process:
    Calculate the initial theoretical emission time:
        $TET_{init} = T_{inc} + R_p$
    Find the slot number $N_s$ in which this $TET_{init}$ value initially places the frame:
        $N_s = \lceil \log_2 TET_{init} \rceil$ for $TET_{init} \geq 1$, or
        $N_s = 0$, for $TET_{init} < 1$
    Calculate the round-down value $R_c$:
        $R_c = TET_{init} - 2^{N_s-1}$ for $N_s > 1$, or
        $R_c = TET_{init}$ for $N_s = 0$
    Calculate theoretical emission time:
        $TET = TET_{init} - R_c$
    The frame is scheduled in slot $N_s - 1$ or 0, if $N_s - 1 < 0$
    The $TET_{init}$ of the next frame will be increased by the round-down value $R_p$ used in scheduling of this frame:
        $R_p = R_c$

---

The down-up rounding method is somewhat similar to the up-down rounding method. Now, however, in step 1301, the increment of the frame being scheduled on the calendar is increased by $R_p$, the value used to round down $TET_{init}$ in the previous calculation. Then, in step 1302, as in the up-down rounding method, the method finds slot number $N_s$ for the calculated value $TET_{init}$. In the next step, step 1303, however, the method finds how far the $TET_{init}$ is from the left boundary $2^{N_s-1}$ of slot $N_s$. Finally, in step 1304, the theoretical emission time is calculated by decreasing the $TET_{init}$ by the round-down value of $R_c$. In step 1305, the frame is scheduled to be processed according to the theoretical emission time as calculated in step 1304.

The frame is eventually scheduled in the slot $N_s-1$, that is, the slot of immediately higher resolution than the slot in which the initial value theoretical emission time placed the frame.

As in the up-down rounding method, before the theoretical emission time for the next frame is calculated, the value $R_c$ is assigned to $R_p$ that will be used to increase the initial value $TET_{init}$ in the iteration for the next frame.

The down-up rounding method provides fairness to and differentiation between frames of different weights, similar to the up-down rounding method. Complexities of these methods are also comparable. However, the down-up rounding method significantly decreases interference with high-weight frames. This is because frames are confined to slots $N_s$ and $N_s-1$ only (as explained in more detail below). In the up-down rounding method, as described in the example of the up-down rounding method presented above, frames may be scheduled even in the slots of the highest resolution regardless of their weights and increment values.

Up-Only Rounding Method

Figure 14:
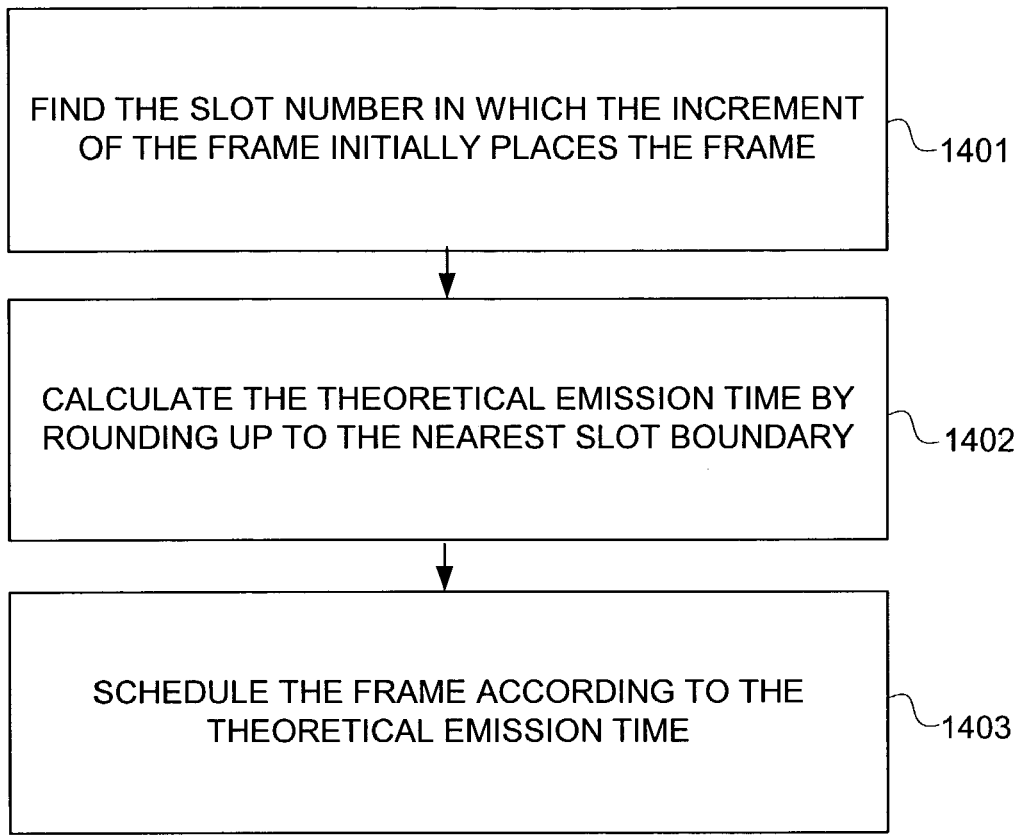
FIG. 14 is a flow diagram illustrating an example of the up-only rounding method.

FIG. 14 is a flow diagram illustrating an example of the up-only rounding method. This example may be described as follows:

---

Let $T_{inc}$ be an increment of a given frame.
Repeat the following process for every frame processed by the system:
    Find the slot number $N_s$ in which the increment $T_{inc}$
    initially places the frame:
        $N_s = \lceil \log_2 TET_{inc} \rceil$ for $TET_{inc} \geq 1$, or
        $N_s = 0$, for $TET_{inc} < 1$
    Calculate theoretical emission time:
        $TET = 2^{N_s}$
    The frame is scheduled in slot $N_s$.

---

The up-only rounding method is simpler than the up-down and down-up rounding methods presented above. In step 1401, the slot number in which the increment of the frame initially places the frame is determined. In step 1402, the theoretical emission time is calculated for the slot number corresponding to the increment $T_{inc}$ of a scheduled frame by simply rounding up to the nearest slot boundary, and the scheduled frame is scheduled in the relevant slot according to the calculated theoretical emission time. In step 1403, the frame is scheduled to be processed according to the theoretical emission time as calculated in step 1402.

The simplicity of the up-only rounding method is advantageous. There are fewer operations and the method need not store any values from one frame to another.

Also, frames with the given weight are always scheduled in the same slots, which means that they do not interfere with high-weight frames scheduled in high-resolution slots.

However, service differentiation between frames of slightly different weights can be more problematic with this method. Using the example described above with respect to the up-down rounding method, two frames with increments 2.2 and 3.8 will, at least in that example, always be scheduled in the same slot number 2. If increments of two frames are close enough, the frames will be scheduled the same slot.

Down-Only Rounding Method

Figure 15:
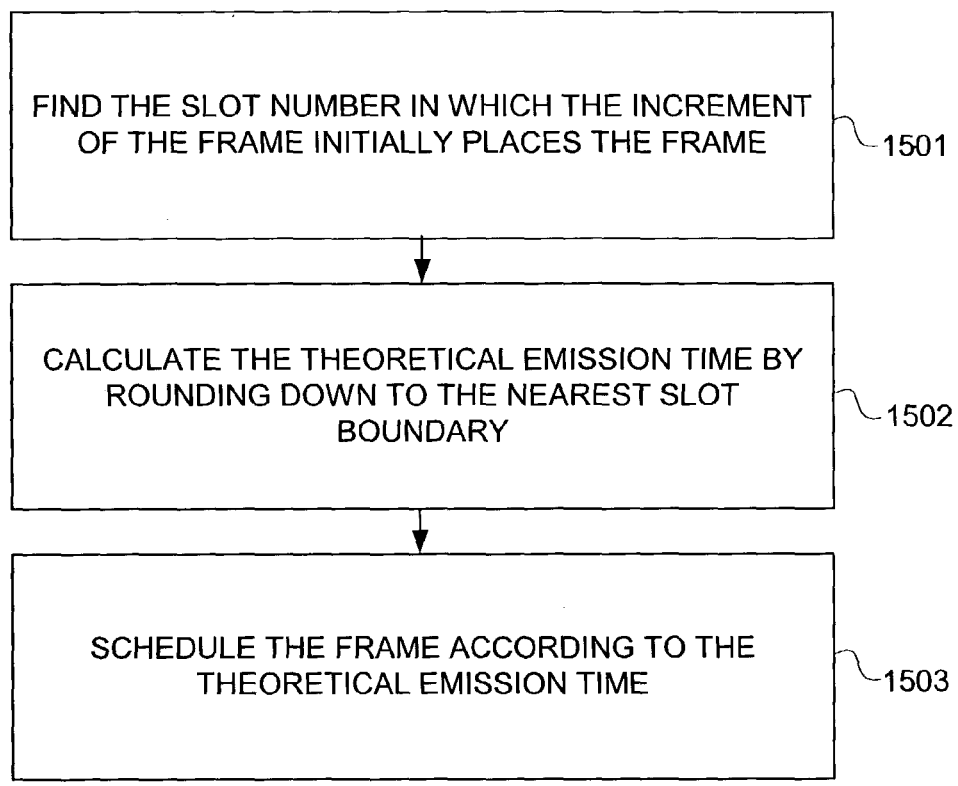
FIG. 15 is a flow diagram illustrating an example of the down-only rounding method.

FIG. 15 is a flow diagram illustrating an example of the down-only rounding method. This example may be described as follows:

---

Let $T_{inc}$ be an increment of a given frame.
Repeat the following process for every frame processed by the system:
    Find the slot number $N_s$ in which the increment $T_{inc}$
    initially places the frame:
        $N_s = \lceil \log_2 TET_{inc} \rceil$ for $TET_{inc} \geq 1$, or
        $N_s = 0$, for $TET_{inc} < 1$
    Calculate theoretical emission time:
        $TET = 2^{N_s-1}$, for $N_s > 1$, or
        $TET = 0$, for $N_s = 0$
    The frame is scheduled in slot $N_s - 1$ or 0, if $N_s - 1 < 0$.

---

In accordance with this method, in step 1501, the slot number in which the increment of the frame initially places the frame is determined. In step 1502, the theoretical emission time is calculated for the slot number corresponding to the initial value of theoretical emission time (where the initial value of the theoretical emission time is equal to the interval, $T_{inc}$, of the frame in the up-only and down-only rounding methods) is rounded down to the nearest left boundary of a slot. This effectively schedules the frame in the slot of immediately higher resolution. Like in the up-only rounding method, all frames with a given weight are scheduled in the same slot. In step 1503, the frame is scheduled to be processed according to the theoretical emission time as calculated in step 1502.

Both methods share the simplicity and a lack of service differentiation between frames of slightly different weights. Unlike the up-only rounding method, however, this method does interfere with frames scheduled in slots of higher resolution. Specifically, frames whose increments place them in slots 1 and 0 are not distinguished by this method—all those frames are scheduled in slot 0, i.e., the slot of the highest resolution.

Comparison of the Rounding Methods

The four methods described above may be considered according to the following criteria:

Complexity

Differentiation in servicing frames of different weights

Interference with high-weight frames

These three criteria have already been discussed to some extent above. To better estimate interference with high-weight frames, the parameter average slot number $N_{avg}$ is meaningful.

As described above (with respect to the up-down rounding method and the down-up rounding method), frames with the given weight are scheduled in slots of varying resolution. This allows differentiating between frames of slightly different weights, and providing higher-weight frames with more opportunities to be scheduled ahead of lower-weight frames. The average slot number $N_{avg}$ will indicate the slot, on average, in which frames with the given increment $T_{inc}$ are scheduled.

The up-only rounding method and the down-only rounding method are relatively straightforward—a frame with the given $T_{inc}$ is preferably always scheduled in the same slot. In such a case, the average slot number $N_{avg}$ is simply equal to the number of a slot in which the method schedules the frames.

Using the above three criteria, an optimal method may be selected. Generally, a method having low complexity, providing differentiation between frames of slightly different weights, and minimizing the extent to which low-weight frames interfere with high-weight frames would be preferred. The interference will be represented by low values of average slot number $N_{avg}$ as $T_{inc}$ increases (and the weight decreases).

Figure 9:
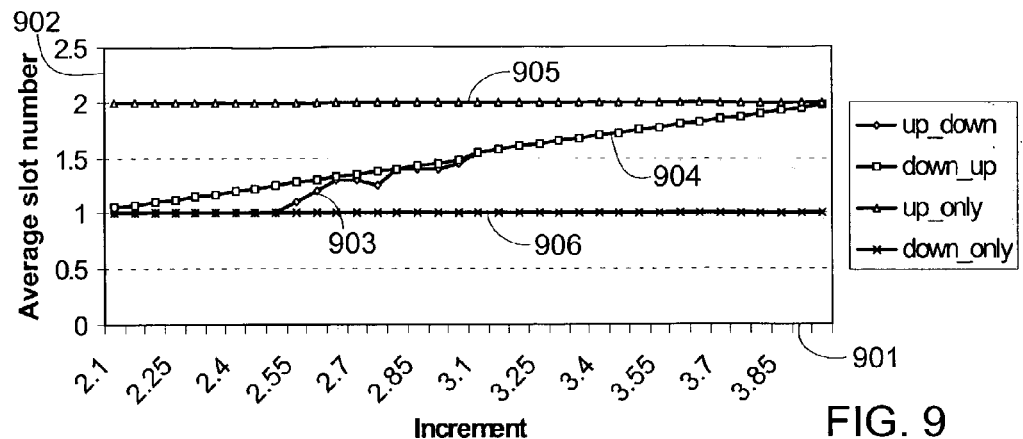
FIG. 9 is a graph illustrating an example of a relationship between an average slot number $N_{avg}$ and an increment $T_{inc}$ for slot 2 ($2 < T_{inc} \leq 4$) in accordance with an embodiment of the invention.

FIG. 9 is a graph illustrating an example of a relationship between an average slot number $N_{avg}$ and an increment $T_{inc}$ for slot 2 ($2 < T_{inc} \leq 4$) in accordance with an embodiment of the invention. Average slot numbers are plotted for increments for slot 2 in relation to increment axis 901 and average slot number axis 902. The average slot numbers according to an example of the up-down rounding method are depicted by plot 903. The average slot numbers according to an example of the down-up rounding method are depicted by plot 904. The average slot numbers according to an example of the up-only rounding method are depicted by plot 905. The average slot numbers according to an example of the down-only rounding method are depicted by plot 906.

Figure 10:
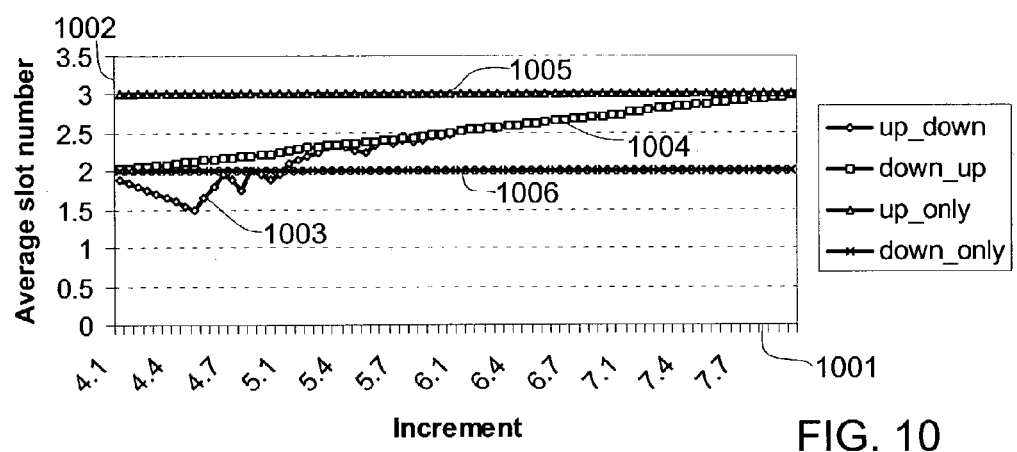
FIG. 10 is a graph illustrating an example of a relationship between an average slot number $N_{avg}$ and an increment $T_{inc}$ for slot 3 ($4 < T_{inc} \leq 8$) in accordance with an embodiment of the invention.

FIG. 10 is a graph illustrating an example of a relationship between an average slot number $N_{avg}$ and an increment $T_{inc}$ for slot 3 ($4 < T_{inc} \leq 8$) in accordance with an embodiment of the invention. Average slot numbers are plotted for increments for slot 3 in relation to increment axis 1001 and average slot number axis 1002. The average slot numbers according to an example of the up-down rounding method are depicted by plot 1003. The average slot numbers according to an example of the down-up rounding method are depicted by plot 1004. The average slot numbers according to an example of the up-only rounding method are depicted by plot 1005. The average slot numbers according to an example of the down-only rounding method are depicted by plot 1006.

Figure 11:
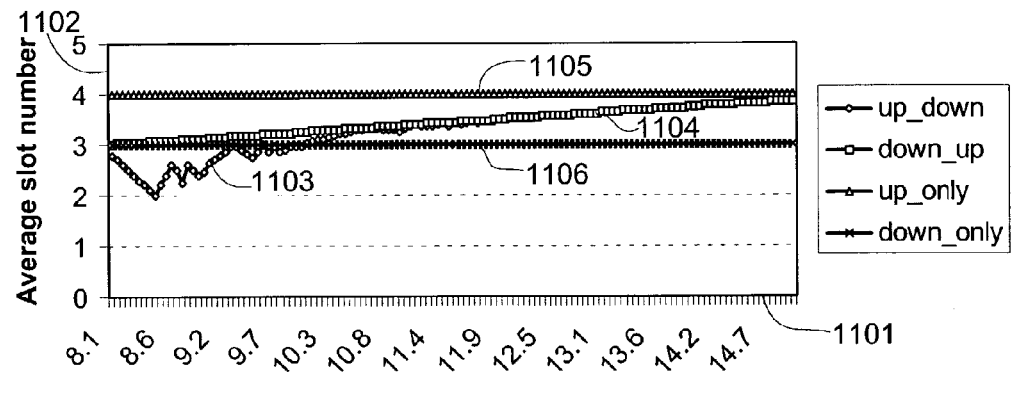
FIG. 11 is a graph illustrating an example of a relationship between an average slot number $N_{avg}$ and an increment $T_{inc}$ for slot 4 ($8 < T_{inc} \leq 16$) in accordance with an embodiment of the invention.

FIG. 11 is a graph illustrating an example of a relationship between an average slot number $N_{avg}$ and an increment $T_{inc}$ for slot 4 ($8 < T_{inc} \leq 16$) in accordance with an embodiment of the invention. Average slot numbers are plotted for increments for slot 4 in relation to increment axis 1101 and average slot number axis 1102. The average slot numbers according to an example of the up-down rounding method are depicted by plot 1103. The average slot numbers according to an example of the down-up rounding method are depicted by plot 1104. The average slot numbers according to an example of the up-only rounding method are depicted by plot 1105. The average slot numbers according to an example of the down-only rounding method are depicted by plot 1106.

FIGS. 9-11 show average slot number $N_{avg}$ for increment values $T_{inc}$ initially placing a frame in slots 2, 3 and 4, respectively. $N_{avg}$ is measured during a single cycle that spans from the initial moment at which $R_p=0$, consists of subtracting/adding and rounding different intermediate values, and ends back at $R_p=0$. (It can be shown that after a certain number of frames (and iterations of the rounding method) $TET_{init}$ will be equal to the boundary of a slot, which in turn will yield the round value $R_p=R_c=0$, that is, the initial state.)

Characteristics of the up-only and down-only rounding methods are discussed below.

In the up-only rounding method, the average slot number $N_{avg}=N_s$ for frames whose increments $T_{inc}$ place them initially in slot $N_s$. This is because, in the up-only rounding method, theoretical emission time is, in fact, the $T_{inc}$ rounded up to the right boundary of the slot. As the above figures indicate, the up-only rounding method provides the upper limit on the slot number in which a frame with a given $T_{inc}$ may be scheduled.

In the down-only rounding method, the average slot number $N_{avg}=N_s-1$ for frames whose increments $T_{inc}$ place them initially in slot $N_s$. This is because, in the down-only rounding method, theoretical emission time is, in fact, the $T_{inc}$ rounded down to the left boundary of the slot. Since the left boundary of a slot belongs to the slot of immediately higher resolution, this effectively schedules the frame in that slot. According to the above figures, in the case of the example provided, only the average slot number $N_{avg}$ of the up-down rounding method assumes lower values and that happens only for slots higher than 2, and $T_{inc}$ in the first half of a slot.

The above figures and analysis suggest that the up-only rounding method is better under some circumstances than the down-only rounding method. Both offer the same low complexity and potentially problematic differentiation between frames of slightly different weights. However, frames whose $T_{inc}$ values are rounded according to the up-only rounding method do not interfere with high-weight frames.

Behavior of the up-down and down-up rounding methods is more complicated and is explained in more detail below. Here, important relations between these two methods may be observed.

As one example, if the increment $T_{inc}$ initially places a frame in the $2^{nd}$ half of slot $N_s$, then the average values of slot number $N_{avg}$ in these two methods are identical. Specifically, with the increasing $T_{inc}$, $N_{avg}$ grows from $N_s-0.5$ to $N_s$. As a closer analysis set forth below reveals, frames with $T_{inc}$ in the $2^{nd}$ half of slot $N_s$ are scheduled only in slots $N_s$ and $N_s-1$. In this range of increments, the average slot number $N_{avg}$ is usually greater than that of the down-only rounding method and less than $N_{avg}$ of the up-only rounding method. This all means that there is a little interference with high-weight frames, and that these two methods differentiate well between frames of slightly different weights.

Behavior of the up-down and down-up rounding methods, however, does differ when the increment $T_{inc}$ initially places a frame in the $1^{st}$ half of slot $N_s$. The average slot number $N_{avg}$ of the up-down rounding method drops down to $0.5 \times N_s$. At the same time, $N_{avg}$ of the down-up rounding method steadily grows, suggesting that frames are scheduled only in slots $N_s$ and $N_s-1$.

Thus, in many cases, the down-up rounding method is preferred over the up-down rounding method. Both have similar complexity and both well differentiate between slightly varying weights. However, for increments placing the frames in the $1^{st}$ half of a slot, the average slot number of the up-down rounding method drops significantly, which means that frames are often scheduled in slots of high resolution, interfering with high-weight frames.

CONCLUSION

Rounding methods with which embodiments of the invention may be practiced have been described above. Such rounding methods are useful to determine where, in the calendar implementation of work-conserving service disciplines, frames are scheduled.

TABLE 2

| Features of rounding methods | | | |
|---|---|---|---|
| Method | Complexity | Differentiation | Interference |
| up-down | high | good | very high |
| down-up | high | good | low |
| up-only | low | poor | none |
| down-only | low | poor | medium |

Table 2 summarizes the properties of the four exemplary methods described above, focusing on their complexity, differentiation between frames of different weights, and interference with high-weight frames scheduled in high-resolution slots.

Both of the more complex rounding methods, the up-down rounding method and the down-up rounding method, provide a good service differentiation between frames of different streams. This means that in the long term, theoretical emission times at which the frames are removed from the calendar are equal to increments $T_{inc}$ that correspond to their weights. The down-up rounding method, however, is often more attractive. Unlike the other method, it introduces little interference with high-weight frames, placing the scheduled frames in slots $N_s$ and $N_s-1$ only. The up-down rounding method, in contrast, can place a frame in the slots of highest resolution, even if the weight of the frame is very low.

Among the less complex rounding methods, the up-only and down-only rounding methods, the former is the often better. The up-only rounding method does not interfere with high-weight frames at all, while the down-only rounding method tends to penalize particularly frames of the highest weights (i.e., those whose increments place them in slot 0).

With the additional complexity, the down-up rounding method is often preferable. It provides little interference with high-weight frames and, unlike the two less complex methods, it differentiates between frames of different weights. Otherwise, up-only rounding method seems to be a good compromise that, despite a less-than-ideal differentiation, introduces no interference with high-weight frames.

The examples described above are not intended to limit the scope of rounding methods with which embodiments of the invention may be practiced. Other calendar structures and methods may be selected, for example, to provide different levels of scheduling performance. Also, by performing simulations in accordance with such methods for different work-conserving service disciplines and typical traffic patterns, characteristics presented above may be assessed according to how they may affect real-life scenarios.

Appendix A

Analysis of how performance of the up-down and down-up rounding methods differs when a frame is scheduled in the 1st half of a slot, and is identical if a frame is scheduled in the 2nd half of a slot is provided below.

First, as an example, the boundaries of slot $N_s$ are $2^{N_s-1}$ and $2^{N_s}$ for $N_s \geq 1$, and 0 and 1 for $N_s=0$. Specifically, a frame is initially placed in slot $N_s$ if:

$$2^{N_s-1} < T_{inc} \leq 2^{N_s}, \text{ for } N_s \geq 1 \text{ and}$$

$$0 < T_{inc} \leq 1, \text{ for } N_s=0.$$

In such an example, frames initially scheduled in slot 0, where the calendar resolution is highest, always stay there. That case is not particularly interesting, so cases where $N_s \geq 1$ may be considered, for example, cases in which the initial value of increment $T_{inc}$ places a frame in slot 1 or higher. Thus, a frame is initially placed in slot $N_s \geq 1$ if:

$$2^{N_s-1} < T_{inc} \leq 2^{N_s} \quad \text{(expression 1)}.$$

A.1 Increment Places a Frame in the 1st Half of a Slot

A frame is initially scheduled in the 1st half of slot $N_s$ if:

$$2^{N_s-1} < T_{inc} \leq 3 \times 2^{N_s-2} \quad \text{(expression 2)}$$

A.1.1 Up-Down Rounding Method

According to the example provided of the up-down method, the initial theoretical emission time $$TET_{init} = T_{inc} - R_p \quad \text{(expression 3)}$$

is calculated first. Since at the beginning $R_p=0$, $TET_{init}$ is simply equal to $T_{inc}$.

Then, $TET_{init}$ is rounded up to the nearest right boundary of a slot. Assuming that $T_{inc}$ places a frame in the first half of slot $N_s$, the round-up value will be:

$$R_c = 2^{N_s} - T_{inc} \quad \text{(expression 4)}$$

where $T_{inc}$ fulfils (expression 2).

Note that increment $T_{inc}$ can be expressed in the following way:

$$T_{inc} = 2^{N_s-1} + R_{offset} \quad \text{(expression 5)}$$

In this case, $R_{offset}$ shows how far the increment $T_{inc}$ places a frame from the left boundary of the slot. Since $T_{inc}$ fulfils (expression 2), then:

$$0 < R_{offset} \leq 2^{N_s-2} \quad \text{(expression 6)}$$

Now, substituting $T_{inc}$ in (expression 4) with (expression 5), the round-up value $R_c$ can be expressed as:

$$R_c = 2^{N_s} - (2^{N_s-1} + R_{offset}) \quad \text{(expression 7)}$$

At that time, after the initial theoretical emission time $TET_{init}$ is rounded up to $2^{N_s}$, the frame is scheduled in slot $N_s$.

Before theoretical emission time is calculated for the next frame, the current round-up value $R_c$ is assigned to $R_p$:

$$R_p = R_c \text{ (expression 8)}.$$

Then, for the next frame, the initial value of theoretical emission time is calculated according to (3). Substituting $T_{inc}$ and $R_p$ with (expression 5), (expression 8) and (expression 7), we get:

$$TET_{init} = (2^{N_s-1} + R_{offset}) - [2^{N_s} - (2^{N_s-1} + R_{offset})] = 2 \times R_{offset} \quad \text{(expression 9)}.$$

Now, let us see where this value of $TET_{init}$ places a frame, depending on the value $R_{offset}$.

If $R_{offset}$ is big, that is, according to (expression 6), if $R_{offset} \approx 2^{N_s-2}$ but still less than $2^{N_s-2}$, then $TET_{init} \approx 2 \times 2^{N_s-2} \approx 2^{N_s-1}$ but less than $2^{N_s-1}$. This value of $TET_{init}$, rounded to the nearest right boundary of a slot, places a frame in slot $N_s-1$.

If $R_{offset}$ is small, that is, if $R_{offset} \approx 0$, then $TET_{init} \approx 0$. Rounded up to the nearest slot boundary, this value will place a frame in slot 0.

It now becomes clear that regardless of how large the increment is, a frame may be scheduled even in a slot of the highest resolution, as long as the increment initially places that frame in the first half of a slot. Specifically, with the use of the up-down rounding method, such frames may be scheduled in slots $N_s-1$ down to 0. That obviously increases the interference with high-weight frames, which in FIG. 9-FIG. 11 is signalled by low values of the average slot number $N_{avg}$.

A.1.2 Down-Up Rounding Method

Now, let us look at the behavior of the down-up rounding method, when a value of increment $T_{inc}$ places a frame in the first half of a slot.

According to the example of the down-up rounding method described above, the initial value of theoretical emission time $$TET_{init} = T_{inc} + R_p \quad \text{(expression 10)}$$

is calculated first. Since at the beginning $R_p=0$, $TET_{init}$ is simply equal to $T_{inc}$.

Then, $TET_{init}$ is rounded down to the left boundary of a slot. Assuming that $T_{inc}$ places a frame in the first half of slot $N_s$, the round-down value will be:

$$R_c = T_{inc} - 2^{N_s-1} \quad \text{(expression 11)}$$

where $T_{inc}$ fulfils the inequality of (expression 2).

Similar to the up-down rounding method, the increment $T_{inc}$ can be expressed as a sum of the left boundary of a slot, and a certain offset $R_{offset}$ ((expression 5) and (expression 6)).

Now, substituting $T_{inc}$ (expression 11) by (expression 5), the round-down value $R_c$ can be expressed as:

$$R_c = 2^{N_s-1} + R_{offset} - 2^{N_s-1} = R_{offset} \quad \text{(expression 12)}.$$

At that time, after the initial theoretical emission time $TET_{init}$ is rounded down to $2^{N_s-1}$, the frame is scheduled in slot $N_s-1$.

Before theoretical emission time is calculated for the next frame, the current round-down value $R_c$ is assigned to $R_p$, according to (expression 8).

Then, for the next frame, the initial value of theoretical emission time is calculated according to (10). Substituting $T_{inc}$ and $R_p$ with (expression 5), (expression 8) and (expression 12), we get:

$$TET_{init} = (2^{N_s-1} + R_{offset}) + R_{offset} = 2^{N_s-1} + 2 \times R_{offset} \quad \text{(expression 13)}.$$

Now, let us see where this value of $TET_{init}$ places a frame, depending on the value of $R_{offset}$.

If $R_{offset}$ is big, that is, according to (expression 6), if $R_{offset} \approx 2^{N_s-2}$ but less than $2^{N_s-2}$, then $TET_{init} \approx 2^{N_s-1} + 2 \times 2^{N_s-2} \approx 2^{N_s}$ but less than $2^{N_s}$. This value of $TET_{init}$, rounded down to the nearest left boundary of a slot, places a frame in slot $N_s-1$.

If $R_{offset}$ is small, that is, if $R_{offset} \approx 0$, then $TET_{init} \approx 2^{N_s-1}$ but greater than $2^{N_s-1}$. Rounded down to the nearest slot boundary, this value will again place a frame in slot $N_s-1$.

Thus, with the use of the down-up rounding method, a frame can preferably never be scheduled in slots with numbers less than $N_s-1$, as long as the increment initially places that frame in the first half of a slot. That decreases the interference with high-weight frames, which is represented in the comparative figures described above with higher values of average slot number. It also explains why performance of the down-up rounding method is often better than the up-down rounding method in that range of increments.

Note that in fact, frames will preferably be scheduled not only in slots $N_s-1$, but in $N_s$, as well. To understand why, consider where the next frame is scheduled if, according to the above analysis, $TET_{init} \approx 2^{N_s}$.

As mentioned above, $TET_{init}$ is rounded down, and the frame is scheduled in slot $N_s-1$. The value by which $TET_{init}$ is rounded down in that case is:

$$R_c = T_{init} - 2^{N_s-1} \approx 2^{N_s} - 2^{N_s-1} \approx 2^{N_s-1}$$

This value, as $R_p = R_c$, is later added to $T_{inc}$ in the calculation of initial theoretical emission time for the next frame (according to expression 10). Since $T_{inc} > 2^{N_s-1}$ (according to expression 2), then $TET_{init} = T_{inc} + R_p$ may push $TET_{init}$ value beyond the right boundary of slot $N_s$, but no further than slot $N_s+1$. When that happens, rounding down the value of $TET_{init}$ will place a frame in slot $N_s$.

Thus, with the use of this example of the down-up rounding method, frames may preferably be scheduled in slots $N_s-1$ and $N_s$ only.

A.2 Increment Places a Frame in the $2^{nd}$ Half of a Slot

A frame is initially scheduled in the $2^{nd}$ half of slot $N_s$ if:

$$3 \times 2^{N_s-2} \leq T_{inc} \leq 2^{N_s} \quad \text{(expression 14)}.$$

A.2.1 Up-Down Rounding Method

According to the example of the up-down method described above, the up-down rounding method calculates the initial theoretical emission time $TET_{init}$ (according to expression 3), and round-up value $R_c$ (according to expression 4). As before (according to expression 5), increment $T_{inc}$ can be expressed as the sum of the left boundary of slot $N_s$, and an offset $R_{offset}$. This time, however:

$$2^{N_s-2} \leq R_{offset} \leq 2^{N_s-1} \quad \text{(expression 15)}$$

to reflect the fact that the frame is initially scheduled in the second half of a slot.

With the value of $R_c$ represented by (expression 7), the frame is scheduled in slot $N_s$ after the initial theoretical emission time $TET_{init}$ is rounded up to $2^{N_s}$. Finally, current round-up value $R_c$ is assigned to $R_p$ (according to expression 8).

As recited above (according to expression 9), $TET_{init} = 2 \times R_{offset}$. Thus, if $R_{offset}$ is big, that is, (according to expression 15) if $R_{offset} \leq 2^{N_s-1}$, then $TET_{init} \leq 2 \times 2^{N_s-1} = 2^{N_s}$. This value of $TET_{init}$, rounded to the nearest right boundary of a slot, places a frame in slot $N_s$.

If $R_{offset}$ is small, that is, if $R_{offset} \geq 2^{N_s-2}$, then $TET_{init} \geq 2 \times 2^{N_s-2} = 2^{N_s-1}$. Rounded up to the nearest slot boundary, a frame is again placed in slot $N_s$.

According to this analysis for this example, it would appear that a frame may be scheduled only in slot $N_s$. In fact, frames can be scheduled in slots $N_s$ and $N_s-1$. To understand why, consider where the next frame is scheduled.

$2^{N_s-1} \leq TET_{init} \leq 2^{N_s}$ means that the round-up value $R_c = 2^{N_s} - TET_{init}$ is:

$$0 \leq R_c \leq 2^{N_s-1}.$$

This value, as $R_p = R_c$, is later added subtracted from $T_{inc}$ in the calculation of initial theoretical emission time for the next frame (according to expression 3). Since $T_{inc} \geq 3 \times 2^{N_s-2}$ places a frame in the $2^{nd}$ half of slot $N_s$ (according to expression 14), then $TET_{init} = T_{inc} - R_p$ may push $TET_{init}$ value below the left boundary $2^{N_s-1}$ of slot $N_s$, but no further than slot $N_s-1$. When that happens, rounding up the value of $TET_{init}$ will place a frame in slot $N_s-1$.

Thus, with the use of such an example of the up-down rounding method, and with $T_{inc}$ placing a frame in the $2^{nd}$ half of a slot, frames may preferably be scheduled in slots $N_s-1$ and $N_s$ only.

It is clear now that the behavior of this method is different depending on the value of $T_{inc}$. The up-down rounding method can schedule frames in slots of the highest resolution regardless of how big $T_{inc}$ is, if only $T_{inc}$ initially places a frame close to the left boundary of a slot. That can increase interference with high-weight frames, making this method inferior under such circumstances to the down-up rounding method.

If, on the other hand, $T_{inc}$ initially places a frame in the second half of slot, the down-up rounding method schedules frames without interfering with high-weight frames.

A.2.2 Down-Up Rounding Method

Now, consider the behavior of the down-up rounding method when a value of increment $T_{inc}$ places a frame in the second half of a slot.

According to the example of the down-up rounding method described above, the down-up rounding method first calculates the initial value of theoretical emission time $TET_{init}$ (according to expression 10), and round-down value $R_c$ (according to expression 11). As before (according to expression 5), increment $T_{inc}$ can be expressed as the sum of the left boundary of slot $N_s$, and an offset $R_{offset}$. This time, however, $R_{offset}$ has a value (according to expression 15) to reflect the fact that the frame is initially scheduled in the second half of a slot.

With the value of $R_c$ determined consistent with the foregoing (according to expression 11), the frame is scheduled in slot $N_s-1$, after the initial theoretical emission time $TET_{init}$ is rounded down to $2^{N_s-1}$. Finally, current round-down value $R_c$ is assigned to $R_p$ (according to expression 8).

As recited above (according to expression 13), $TET_{init}=2^{N_s-1}+2\times R_{offset}$. Thus, if $R_{offset}$ is big, that is, (according to expression 15) if $R_{offset} \leq 2^{N_s-1}$, then $TET_{init} \leq 2^{N_s-1}+2\times 2^{N_s-1}=3\times 2^{N_s-1}$. This value of $TET_{init}$, rounded down to the nearest left boundary $2^{N_s}$ of a slot, places a frame in slot $N_s$.

If $R_{offset}$ is small, that is, if $R_{offset} \geq 2^{N_s-2}$, then $TET_{init} \geq 2^{N_s-1}+2\times 2^{N_s-2}=2^{N_s}$. Rounded down to the nearest slot boundary, a frame is again placed in slot $N_s$.

Next frames can be scheduled not only in slot $N_s$, but in slot $N_s-1$, as well. To understand why, consider where the next frame is scheduled.

$2^{N_s} \leq TET_{init} \leq 3\times 2^{N_s-1}$ means that the round-down value $R_c=TET_{init}-2^{N_s}$ is:

$0 \leq R_c \leq 2^{N_s-1}$.

This value, as $R_p=R_c$, is later added to $T_{inc} \geq 3\times 2^{N_s-2}$ in the calculation of initial theoretical emission time for the next frame (according to expression 10). Since $T_{inc}$ places a frame in the $2^{nd}$ half of slot $N_s$ (according to expression 14), then $TET_{init}=T_{inc}+R_p$ may leave the $TET_{init}$ within the boundaries of slot $N_s$. This means that rounding down the value of $TET_{init}$ will place a frame in slot $N_s-1$.

Thus, with the use of such an example of the down-up rounding method, and $T_{inc}$ placing a frame in the $2^{nd}$ half of a slot, frames may preferably be scheduled in slots $N_s-1$ and $N_s$ only.

Accordingly, a method and apparatus for scheduling and servicing events using a calendar structure has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for scheduling events comprising the steps of:
    defining a plurality of calendar tiers, the calendar tiers having an exponential relationship among the calendar tiers with respect to a desired temporal resolution of the events;
    assigning the events to the calendar tiers based on the desired temporal resolution of the events; and
    servicing the events assigned to the calendar tiers so as to cause performance of tasks corresponding to the events
    determining a remainder based on a difference between a time value of a temporal pointer and a preferred occurrence time;
    and assigning a second occurrence of an event of the events to a calendar tier of the calendar tiers based on the remainder.

2. The method of claim 1 wherein the step of servicing the events assigned to the calendars further comprises the step of:
    removing the events from the calendar tiers.

3. The method of claim 1 wherein the step of servicing the events further comprises the step of:
    servicing a first event of the events assigned to a first calendar slot of a first calendar tier of the calendar tiers.

4. The method of claim 3 wherein the step of assigning the events to the calendar tiers further comprises the step of:
    assigning a second event of the events to a second calendar slot of the first calendar tier of the calendar tiers.

5. The method of claim 4 wherein the step of servicing the events further comprises the step of:
    servicing the second event assigned to the second calendar slot of the first calendar tier.

6. The method of claim 5 wherein the step of servicing the second event and the step of servicing the first event occur at different values of a temporal pointer.

7. The method of claim 1 wherein the step of assigning further comprises:
    rounding in accordance with an up-down rounding method.

8. The method of claim 1 wherein the step of assigning further comprises:
    rounding in accordance with a down-up rounding method.

9. The method of claim 1 wherein the step of assigning further comprises:
    rounding in accordance with an up-only rounding method.

10. The method of claim 1 wherein the step of assigning further comprises:
    rounding in accordance with a down-only rounding method.

11. A method for scheduling events comprising the steps of:
    defining a plurality of calendar tiers in a storage medium of an information processing system, the storage medium readable by the information processing system, the calendar tiers having an exponential relationship among the calendar tiers with respect to a desired temporal resolution of the events;
    assigning the events to the calendar tiers based on the desired temporal resolution of the events; and
    servicing the events assigned to the calendar tiers so as to communicate data across a communication channel in accordance with the desired temporal resolution of the events corresponding to the data
    determining a remainder based on a difference between a time value of a temporal pointer and a preferred occurrence time; and
    assigning a second occurrence of an event of the events to a calendar tier of the calendar tiers based on the remainder.

12. The method of claim 11 wherein the step of servicing the events assigned to the calendar tiers further comprises the step of:
    removing the events from the calendar tiers.

13. The method of claim 11 wherein the step of servicing the events further comprises the step of:
    servicing a first event of the events assigned to a first calendar slot of a first calendar tier of the calendar tiers.

14. The method of claim 13 wherein the step of assigning the events to the calendar tiers further comprises the step of:
    assigning a second event of the events to a second calendar slot of the first calendar tier of the calendar tiers.

15. The method of claim 14 wherein the step of servicing the events further comprises the step of:
    servicing the second event assigned to the second calendar slot of the first calendar tier.

16. The method of claim 15 wherein the step of servicing the second event and the step of servicing the first event occur at different values of a temporal pointer.

17. The method of claim 11 wherein the step of assigning further comprises:

rounding in accordance with an up-down rounding method.

18. The method of claim 11 wherein the step of assigning further comprises:
rounding in accordance with a down-up rounding method.

19. The method of claim 11 wherein the step of assigning further comprises:
rounding in accordance with an up-only rounding method.

20. The method of claim 11 wherein the step of assigning further comprises:
rounding in accordance with a down-only rounding method.

21. A method for servicing a shaper calendar comprising the steps of:
servicing a highest resolution event sequence to cause performance of a first set of tasks at a first set of assigned times;
servicing a first lower resolution event sequence to cause performance of a second set of tasks at a second set of assigned times, the second set of assigned times being distinct from and exponentially less frequent than the first set of assigned times;
servicing a second lower resolution event sequence to cause performance of a third set of tasks at a third set of assigned times, the third set of assigned times being distinct from the first set of assigned times and the second set of assigned times and being exponentially less frequent than the second set of assigned times
determining a remainder based on a difference between a time value of a temporal pointer and a preferred occurrence time for each task of the sets of tasks; and
assigning a second occurrence of an event of the events to a calendar tier of the calendar tiers based on the remainder for each task of the sets of tasks.

22. The method of claim 21 wherein the first set of tasks, the second set of tasks, and the third set of tasks comprise communication of a first set of data, a second set of data, and a third set of data, respectively, across a communication channel.

23. The method of claim 21 wherein the step of servicing the highest resolution event sequence occurs when a value of a temporal pointer satisfies a first condition, wherein the step of servicing the first lower resolution event sequence occurs when the value of the temporal pointer satisfies a second condition, and wherein the step of servicing the second lower resolution event sequence occurs when the value of the temporal pointer satisfies a third condition, wherein the first condition, the second condition, and the third condition are mutually exclusive.

24. The method of claim 23 wherein the first condition occurs when the temporal pointer has a binary value ending in 1.

25. The method of claim 24 wherein the second condition occurs when the temporal pointer has the binary value ending in 10.

26. The method of claim 25 wherein the third condition occurs when the temporal pointer has the binary value ending in 100.

27. The method of claim 21 wherein the first set of assigned times, the second set of assigned times, and the third set of assigned times are deterministically related to values of a temporal pointer.

28. The method of claim 21 wherein the first set of assigned times, the second set of assigned times, and the third set of assigned times are determined according to an up-down rounding method.

29. The method of claim 21 wherein the first set of assigned times, the second set of assigned times, and the third set of assigned times are determined according to a down-up rounding method.

30. The method of claim 21 wherein the first set of assigned times, the second set of assigned times, and the third set of assigned times are determined according to an up-only rounding method.

31. The method of claim 21 wherein the first set of assigned times, the second set of assigned times, and the third set of assigned times are determined according to a down-only rounding method.

32. A method for servicing events using a calendar structure comprising the steps of:
determining a theoretical emission time;
selecting an event from a temporally earliest occurring calendar slot among calendar slots temporally ahead of a temporal pointer;
servicing the event so as to communicate data across a communication channel
determining a remainder based on a difference between a time value of a temporal pointer and a preferred occurrence time;
and assigning a second occurrence of an event of the events to a calendar tier of the calendar tiers based on the remainder.

33. The method of claim 32 further comprising the step of:
rounding the theoretical emission time in accordance with an up-down rounding method.

34. The method of claim 32 further comprising the step of:
rounding the theoretical emission time in accordance with a down-up rounding method.

35. The method of claim 32 further comprising the step of:
rounding the theoretical emission time in accordance with an up-only rounding method.

36. The method of claim 32 further comprising the step of:
rounding the theoretical emission time in accordance with a down-only rounding method.

* * * * *

UNITED STATES PATENT AND TRADEMARK OFFICE
CERTIFICATE OF CORRECTION

PATENT NO. : 7,596,789 B2  Page 1 of 1
APPLICATION NO. : 10/334204
DATED : September 29, 2009
INVENTOR(S) : Olesinski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1752 days.

Signed and Sealed this

Twenty-eighth Day of September, 2010

David J. Kappos
*Director of the United States Patent and Trademark Office*